United States Patent
Lee et al.

(10) Patent No.: US 9,875,044 B2
(45) Date of Patent: Jan. 23, 2018

(54) DATA STORAGE DEVICE COMPENSATING FOR INITIAL THRESHOLD VOLTAGE DISTRIBUTION SHIFT, METHOD OF OPERATING THE SAME, AND DATA PROCESSING SYSTEM INCLUDING THE SAME

(71) Applicants: Dong Hwan Lee, Namyangju-si (KR); Jun Jin Kong, Yongin-si (KR); Chang Kyu Seol, Osan-si (KR); Hong Rak Son, Anyang-si (KR)

(72) Inventors: Dong Hwan Lee, Namyangju-si (KR); Jun Jin Kong, Yongin-si (KR); Chang Kyu Seol, Osan-si (KR); Hong Rak Son, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 210 days.

(21) Appl. No.: 14/800,783

(22) Filed: Jul. 16, 2015

(65) Prior Publication Data

US 2016/0179415 A1 Jun. 23, 2016

(30) Foreign Application Priority Data

Dec. 23, 2014 (KR) ........................ 10-2014-0186967

(51) Int. Cl.
| | |
|---|---|
| *G06F 3/00* | (2006.01) |
| *G06F 3/06* | (2006.01) |
| *G06F 17/30* | (2006.01) |
| *G06F 12/02* | (2006.01) |
| *G06F 21/79* | (2013.01) |
| *G11C 16/04* | (2006.01) |

(52) U.S. Cl.
CPC ............ *G06F 3/0619* (2013.01); *G06F 3/065* (2013.01); *G06F 3/068* (2013.01); *G06F 3/0653* (2013.01); *G06F 12/0246* (2013.01); *G06F 17/3033* (2013.01); *G06F 17/30867* (2013.01); *G06F 21/79* (2013.01); *G11C 16/0466* (2013.01)

(58) Field of Classification Search
CPC .... G06F 3/0679; G06F 11/1441; G06F 21/79; G06F 12/0246; G06F 1/3296; G06F 2212/2022; G06F 3/064; G06F 3/0676
See application file for complete search history.

(56) References Cited

U.S. PATENT DOCUMENTS

| | | | | |
|---|---|---|---|---|
| 4,870,662 A | * | 9/1989 | Lindbergh | .............. H03M 7/42 341/107 |
| 7,437,498 B2 | | 10/2008 | Ronen | |
| 7,461,233 B2 | | 12/2008 | Hsieh et al. | |
| 8,024,545 B2 | | 9/2011 | Kim et al. | |

(Continued)

FOREIGN PATENT DOCUMENTS

JP 2010165039 7/2010

*Primary Examiner* — David X Yi
*Assistant Examiner* — Candice Rankin
(74) *Attorney, Agent, or Firm* — Volentine & Whitt, PLLC

(57) ABSTRACT

A method is provided for operating a data storage device capable of compensating for an initial threshold voltage shift of multiple memory cells. The method includes generating a first compression value for a first write address corresponding to a first write request input during a first time interval among different time intervals, and storing the first compression value in a first table among multiple tables.

19 Claims, 16 Drawing Sheets

(56) References Cited

U.S. PATENT DOCUMENTS

| | | |
|---|---|---|
| 8,248,856 B2 | 8/2012 | Goss et al. |
| 8,261,136 B2 | 9/2012 | D'Abreu et al. |
| 8,650,353 B2 | 2/2014 | Belgal et al. |
| 9,330,763 B1 * | 5/2016 | Zhang ................ G11C 11/5642 |
| 2012/0051133 A1 | 3/2012 | Kanda |
| 2012/0102259 A1 * | 4/2012 | Goss ........................ G11C 7/04 |
| | | 711/103 |
| 2012/0268994 A1 | 10/2012 | Nagashima |
| 2012/0294104 A1 | 11/2012 | Mun et al. |
| 2013/0103657 A1 * | 4/2013 | Ikawa ............... G06F 17/30985 |
| | | 707/693 |
| 2013/0326115 A1 * | 12/2013 | Goss .................... G06F 3/0641 |
| | | 711/103 |

* cited by examiner

FIG. 8

| Table_i | CODEi | Read Voltage |
|---------|-------|--------------|
| Table_1 | CODE1 | Vread6 |
| Table_2 | CODE2 | Vread5 |
| Table_3 | CODE3 | Vread4 |
| Table_4 | CODE4 | Vread3 |
| Table_5 | CODE5 | Vread2 |
| Table_6 | CODE6 | Vread1 |
| Table_0 | CODE7 | Vread0 |

344

DATA STORAGE DEVICE COMPENSATING FOR INITIAL THRESHOLD VOLTAGE DISTRIBUTION SHIFT, METHOD OF OPERATING THE SAME, AND DATA PROCESSING SYSTEM INCLUDING THE SAME

CROSS-REFERENCE TO RELATED APPLICATIONS

A claim for priority under 35 U.S.C. §119 is made to Korean Patent Application No. 10-2014-0186967 filed on Dec. 23, 2014, in the Korean Intellectual Property Office, the entire contents of which are hereby incorporated by reference.

BACKGROUND

Embodiments of the inventive concept relate to a data storage device, and more particularly, to a data storage device including a table that stores compression values for addresses input during a predetermined period as values for compensating for a shift in initial threshold voltage, a method of operating the same, and a data processing system including the same.

Memory devices used to store data may be divided into volatile memory devices and non-volatile memory devices. The characteristics of memory devices may vary with use environment, the number of uses, and/or a use time.

A flash memory device is an example of electrically erasable programmable read-only memory (EEPROM) in which multiple memory cells are erased or programmed in a single program operation. In a flash memory device using a floating gate technique, data retention characteristics and the number of program-erase (P/E) cycles with no quality deterioration, i.e., endurance, are critical issues in terms of reliability.

Charges or electrons stored in a flash memory cell in a flash memory device may be leaked from a floating gate through various failure mechanisms, such as thermal ion emission through a defective interpoly insulation film, charge diffusion, ion impurities, or program disturb stress. Such leakage would cause the decrease of a threshold voltage.

Repetitive P/E cycles put stress on memory transistor oxide films of flash memory cells, and this stress may cause failure in the flash memory cells. The threshold voltage of flash memory cells may shift (increase or decrease) due to such stress. For example, electrons may be leaked from floating gates of programmed flash memory cells. Accordingly, the threshold voltage distribution of programmed flash memory cells may shift toward lower voltage.

Initial threshold voltages of flash memory cells may have a finite distribution on the basis of processes and design targets. However, the distribution of the initial threshold voltages changes according to use environment, the number of uses, and/or use time. When a program operation or a read operation is performed on a memory device including flash memory cells, an initial threshold voltage distribution needs to be appropriately controlled. When the initial threshold voltage distribution is not appropriately controlled, the program or read operation cannot be appropriately performed on the memory device.

SUMMARY

Various embodiments of the inventive concept provide a data storage device including a table that stores compression values for addresses input during a predetermined period as values for compensating an initial threshold voltage shift in order to ensure an appropriate operation, a method of operating the same, and a data processing system including the same.

According to embodiments of the inventive concept, there is provided a method of operating a data storage device capable of compensating for an initial threshold voltage shift of multiple memory cells. The method includes generating a first compression value for a first write address corresponding to a first write request input during a first time interval among different time intervals, and storing the first compression value in a first table among multiple tables.

Storing the first compression value in the first table may include selecting the first table from among the multiple tables using a first time stamp corresponding to the first write request, and storing the first compression value in the selected first table.

The method may further include generating a second compression value for a read address corresponding to a read request input during a second time interval among the different time intervals, searching the multiple tables for the first table that stores the first compression value the same as the second compression value, compensating for the initial threshold voltage shift of the memory cells based on an index of the first table, and performing a read operation corresponding to the read request using a read voltage corresponding to the compensated initial threshold voltage shift. The different time intervals may correspond to the multiple tables, respectively.

Compensating for the initial threshold voltage shift may be performed based on a second time stamp corresponding to the read request and the index of the first table. Also, compensating for the initial threshold voltage shift may include generating a control code based on the second time stamp and the index of the first table, storing the control code in a memory including the plurality of memory cells, and compensating for the initial threshold voltage shift of the memory cells using the control code stored in the memory.

Each of the first compression value and the second compression value may be generated using one hash value generator. The first compression value and the second compression value may be first and second hash values output from different hash value generators, respectively.

The method may further include initializing the multiple tables periodically. Also, the method may further include writing first write data corresponding to the first write request to a three-dimensional flash memory including the memory cells when the data storage device comprises the three-dimensional flash memory.

According to other embodiments of the inventive concept, there is provided a data storage device, including a memory and a controller. The memory includes multiple memory cells. The controller is configured to compensate for an initial threshold voltage shift of the memory cells. The controller includes a compensation circuit configured to generate a first compression value for a first write address corresponding to a first write request input during a first time interval among different time intervals, and to store the first compression value in a first table among multiple tables.

The compensation circuit may include a compression value generation circuit configured to generate the first compression value for the first write address, and a search circuit configured to select the first table from among the multiple tables using a first time stamp corresponding to the first write request and to store the first compression value in the selected first table. The different time intervals may correspond to the multiple tables, respectively.

The compression value generation circuit may generate a second compression value for a read address corresponding to a read request input during a second time interval among the different time intervals. The search circuit may search the multiple tables for the first table that stores the first compression value the same as the second compression value.

The compression value generation circuit may generate the first compression value including at least one hash value and the second compression value including at least one second hash value using at least one hash value generator.

The search circuit may output an index of the first table as a search result. Also, the controller may further include a decision circuit configured to generate a control code using a second time stamp corresponding to the read request and the index of the first table, and a central processing unit (CPU) configured to output a compensation code for compensating for the initial threshold voltage shift in response to the control code. The memory may compensate for the initial threshold voltage shift of the memory cells using the compensation code output from the CPU, read data corresponding to the read command from the memory cells using a read voltage corresponding to the compensated initial threshold voltage shift, and output the data to the controller.

The controller may further include an internal memory configured to store the multiple tables, and the controller may initialize the tables periodically.

According to other embodiments of the inventive concept, there is provided a data processing system including the data storage device, as described above, and a host configured to control an operation of the data storage device.

In the context of the data processing system, the compensation circuit may include a compression value generation circuit configured to generate the first compression value for the first write address, and a search circuit configured to select the first table from among the multiple tables using a first time stamp corresponding to the first write request and to store the first compression value in the selected first table. The different time intervals may correspond to the multiple tables, respectively.

The compression value generation circuit may generate a second compression value for a read address corresponding to a read request input during a second time interval among the different time intervals, and the search circuit may search the multiple tables for the first table that stores the first compression value the same as the second compression value.

The search circuit may output an index of the first table as a search result. Also, the controller may further include a decision circuit configured to generate a control code using a second time stamp corresponding to the read request and the index of the first table, and a CPU configured to output a compensation code for compensating for the initial threshold voltage shift in response to the control code. The memory may compensates for the initial threshold voltage shift of the memory cells using the compensation code output from the CPU, read data corresponding to the read command from the memory cells using a read voltage corresponding to the compensated initial threshold voltage shift, and output the data to the controller.

The memory may include a three-dimensional memory array including the memory cells. The three-dimensional memory array may include a non-volatile memory that is monolithically formed in one or more physical levels of memory cells having active areas disposed above a silicon substrate. The three-dimensional memory array may include memory cells, each of the memory cells including a charge trap layer.

According to other embodiments of the inventive concept, there is provided a data storage device, including a memory and a controller. The memory includes multiple memory cells. The controller is configured to compensate for an initial threshold voltage shift of the memory cells in response to a control code. The controller includes a CPU configured to generate a first compression value for a first write address corresponding to a first write request input during a first time interval among different time intervals, and to store the first compression value in a first table among multiple tables. The CPU includes a compression value generation module configured to generate a first compression value for the first write address and a second compression value for a read address corresponding to a read request input during a second time interval among the different time intervals, a search engine configured to select the first table from among the multiple tables using a first time stamp corresponding to the first write request and to store the first compression value in the selected first table, where the different time intervals correspond to the plurality of tables, respectively, and a decision module configured to generate the control code using a second time stamp corresponding to the read request and an index of the first table.

BRIEF DESCRIPTION OF THE DRAWINGS

Exemplary embodiments of the inventive concept will be more clearly understood from the following description taken in conjunction with the accompanying drawings, in which:

FIG. 8 is a conceptual diagram of a table for compensating for an initial threshold voltage distribution shift, according to an embodiment of the inventive concept;

DETAILED DESCRIPTION OF THE EMBODIMENTS

Figure 1:
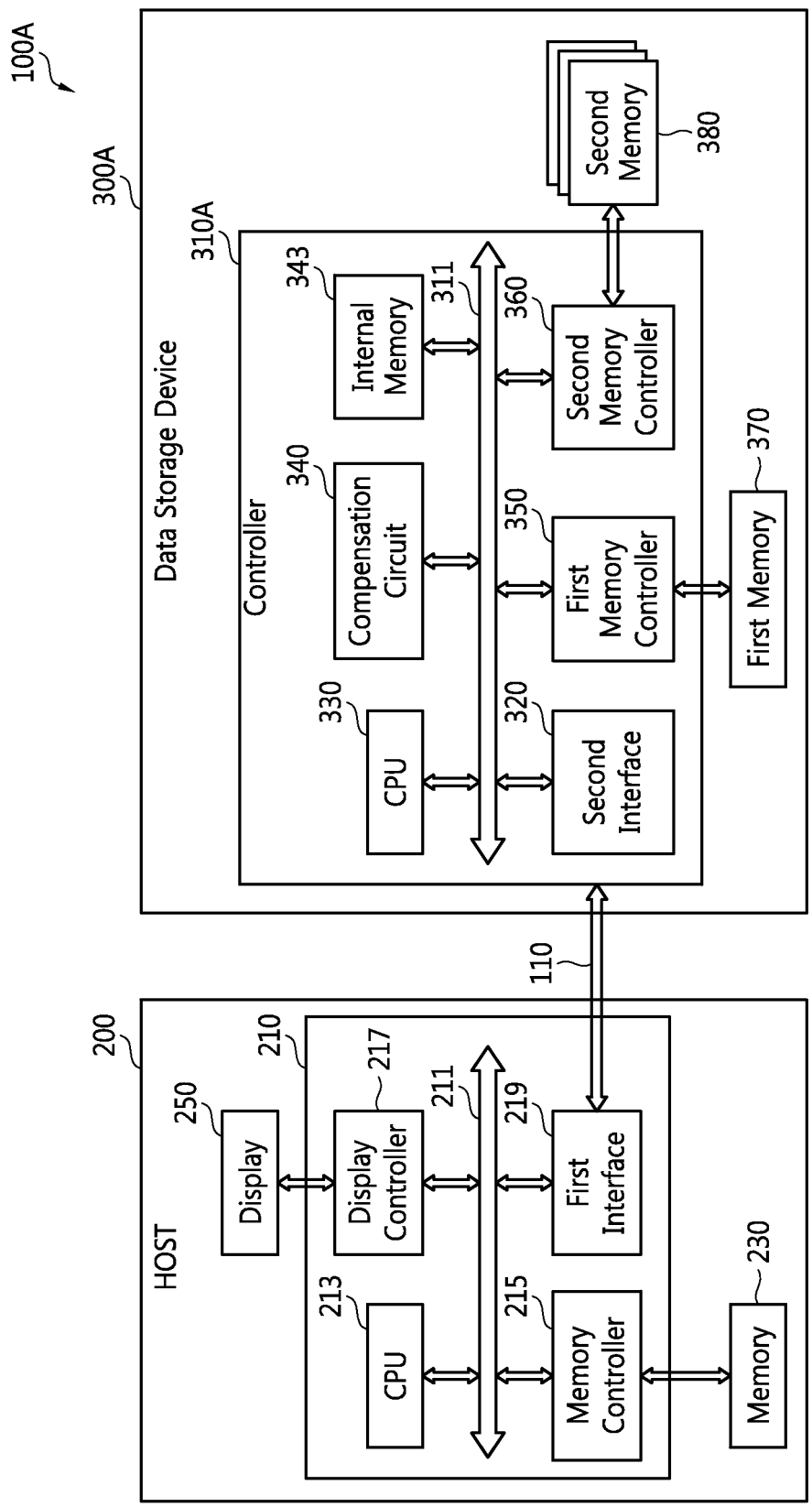
FIG. 1 is a block diagram of a data processing system, according to an embodiment of the inventive concept.

Embodiments will be described in detail with reference to the following description and accompanying drawings. The inventive concept, however, may be embodied in various different forms, and should not be construed as being limited only to the embodiments set forth herein. Rather, these embodiments are provided as examples so that this disclosure will be thorough and complete, and will fully convey the scope of the inventive concept to one of ordinary skill in the art. Accordingly, known processes, elements, and techniques are not described with respect to some of the embodiments. Unless otherwise noted, like reference numerals denote like elements throughout the attached drawings and written description, and thus descriptions may not be repeated. In the drawings, sizes and relative sizes of layers and regions may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 100A, according to embodiments of the inventive concept. As shown in FIG. 1, for example, the data processing system 100A includes a host 200 and a data storage device 300A, which are connected with each other through an interface 110.

The data processing system 100A or 100B (described below), may be implemented as a server computer, a personal computer (PC), a desktop computer, a laptop computer, a workstation computer, a network-attached storage (NAS), a data center, an internet data center (IDC), or a mobile computing device, for example. The mobile computing device may be a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book, although embodiments of the inventive concept are not restricted to these examples.

The interface 101 may support various protocols, such as serial advanced technology attachment (SATA) interface, SATA express (SATAe), serial attached SCSI (small computer system interface) (SAS), and peripheral component interconnect express (PCIe), although embodiments of the inventive concept are not restricted to these examples.

The host 200 controls data processing operations (e.g., write operations or read operations) of the data storage device 300A. The host 200 includes a controller 210, a memory 230, and a display 250. The block diagram of the host 200 illustrated in FIG. 1 is just an example, and the inventive concept is not restricted thereto.

The controller 210 may be implemented as an integrated circuit (IC), a mother board, or a system on chip (SoC). The host 200 may be implemented as an application processor or a mobile application processor. The controller 210 controls operations of the memory 230 and the display 250. The controller 210 includes a bus architecture 211, a central processing unit (CPU) 213, a memory controller 215, a display controller 217, and a first interface 219.

The CPU 213 may communicate commands and/or data with the memory controller 215, the display controller 217, and the first interface 219 via the bus architecture 211. The command may be a request. For example, the bus architecture 211 may be implemented as an advanced microcontroller bus architecture (AMBA), an advanced high-performance bus (AHB), an advanced peripheral bus (APB), an advanced extensible interface (AXI), or an advanced system bus (ASB), although embodiments of the inventive concept are not restricted to these examples.

The CPU 213 generates a write request for controlling a write operation of the data storage device 300A and a read request for controlling a read operation of the data storage device 300A. The write request may include a write address and the read request may include a read address. For example, the CPU 213 may include at least one core.

The memory controller 215 writes data to and reads data from the memory 230 under control of the CPU 213. For example, the memory controller 215 may perform the function of a direct memory access (DMA) controller.

The memory 230 may be formed of volatile memory and/or non-volatile memory. The volatile memory may be random access memory (RAM), static RAM (SRAM), or dynamic RAM (DRAM), for example. The non-volatile memory may be a hard disk drive (HDD), NAND flash memory, NOR flash memory, phase-change RAM (PRAM), magnetoresistive RAM (MRAM), spin-transfer torque MRAM (STT-MRAM), ferroelectric RAM (FRAM), or resistive RAM (RRAM), for example.

Although one memory controller 215 and one memory 230 are illustrated in FIG. 1, it is understood that the memory controller 215 may be representative of a set of multiple memory controllers and that the memory 230 may be representative of a set of multiple memories. The memories may be different types of memories with corresponding different types of memory controllers. For example, when the memories include DRAM and NAND flash memory, the memory controllers include a DRAM controller and a NAND flash memory controller.

The display controller 217 transmits data from the CPU 213 and/or the memory controller 215 to the display 250 under control of the CPU 213. The display 250 displays data. For example, the display controller 217 may transmit the data to the display 250 through mobile industry processor interface (MIPI®) display serial interface (DSI), embedded DisplayPort (eDP), or high-definition multimedia interface (HDMI). The display 250 may or may not include a backlight unit (not shown) providing backlight for a display panel.

The first interface 219 may change the format of a command and/or data to be transmitted to the data storage device 300A, and may transmit the command and/or data in the changed format to the data storage device 300A through the interface 110. The first interface 219 may include a transceiver that transmits and receives a command and/or data.

In the depicted embodiment, the data storage device 300A includes a controller 310A, a first memory 370, and a second memory 380. The data storage device 300A may be implemented as a flash-based memory device. For example, the data storage device 300A may be implemented as a solid state drive or disk (SSD), an embedded SSD (eSSD), a universal flash storage (UFS), a multimedia card (MMC), or an embedded MMC (eMMC), although embodiments of the inventive concept are not restricted to these examples.

The controller 310A controls commands and/or data transferred among the host 200, the first memory 370, and the second memory 380. The commands may be referred to as requests. The controller 310A may be implemented as an IC or a SoC, for example.

The controller 310A includes a bus architecture 311, a second interface 320, a CPU 330, a compensation circuit 340, an internal memory 343, a first memory controller 350, and a second memory controller 360. The bus architecture 311 may be implemented as AMBA, AHB, APB, AXI, or ASB, although embodiments of the inventive concept are not restricted to these examples.

The second interface 320 may change the format of a signal or data to be transmitted to the host 200, and may transmit the signal or data in the changed format to the host 200 through the interface 110. The second interface 320 may include a transceiver that transmits and receives a signal and or data.

The CPU 330 controls the second interface 320, the compensation circuit 340, the internal memory 343, the first memory controller 350, and/or the second memory controller 360 via the bus architecture 311. The CPU 330 may include at least one core.

Although one CPU 330 is illustrated in FIG. 1, it is understood that the CPU 330 may be representative of a CPU set, including a first CPU for controlling a mutual operation with the host 200 and a second CPU for controlling a mutual operation with the second memory 380. Accordingly, the first CPU may control the operation of the second interface 320 and the second CPU may control the operation of the second memory controller 360.

The CPU 330 controls operation of the second memory controller 360 in response to a request (e.g., a write request or a read request) output from the host 200. The CPU 330 may also set data necessary for the operations of the second memory 380 in the second memory 380 using the second memory controller 360.

During a write operation performed according to a write request or command output from the host 200, the compensation circuit 340 generates a first compression value for a write address corresponding to the write request input during one of different time intervals, selects a first table from multiple tables based on a first time stamp with respect to the write request, and stores the first compression value in first selected table.

For example, the tables may be stored in the internal memory 343 and may respectively correspond to the different time intervals. The internal memory 343 may store compression values for write addresses input during a particular time interval as values used to compensate for a shift in an initial threshold voltage. The initial threshold voltage shift may be an initial threshold voltage distribution shift.

During a read operation performed according to a read request or command output from the host 200, the compensation circuit 340 generates a second compression value for a read address corresponding to the read request input during another one of the different time intervals, searches the tables for the first table that stores the first compression value the same as the second compression value, and generates a control code for compensating for an initial threshold voltage shift of multiple memory cells included in the second memory 380 based on a second time stamp with respect to the read request and an index of the first table. The structure and operations of the compensation circuit 340 will be described below in detail with reference to FIGS. 2 through 8.

The internal memory 343 accessed by the CPU 330 stores tables respectively corresponding to different time intervals. In other words, the internal memory 343 may store a table assigned for each time interval. The internal memory 343 may be implemented as an SRAM, a buffer, a buffer memory, or a cache, although embodiments of the inventive concept are not restricted to these examples. The internal memory 343 may be implemented as a tightly coupled memory (TCM) in other embodiments, for example.

The first memory controller 350 writes data to and/or reads data from the first memory 370 under control of the CPU 330. For example, the first memory controller 350 may have the function of a DMA controller. The first memory 370 may be implemented as a buffer or DRAM, for example. Although the internal memory 343 and the first memory 370 are shown separated from each other in the embodiment illustrated in FIG. 1, the internal memory 343 and the first memory 370 may be implemented together in a single memory in other embodiments. Also, the single memory may be located inside or outside the controller 310A.

The second memory controller 360 controls data processing operations (e.g., write and/or read operations) with respect to the second memory 380 under control of the CPU 330. For example, under control of the CPU 330, the second memory controller 360 may set information or data necessary for data processing operations with respect to the second memory 380 in a configuration register (e.g., register 387 in FIG. 11) included in the second memory 380. Write operations may be referred to as program operations.

The second memory controller 360 writes data output from the CPU 330 or the first memory controller 350 to the second memory 380 under control of the CPU 330. In addition, the second memory controller 360 transmits data from the second memory 380 to the bus architecture 311 under control of the CPU 330.

The second memory 380 may include flash-based memory cells, which may be NAND-type flash memory cells or NOR-type flash memory cells. Each of the flash-based memory cells may be a single-level cell (SLC) that stores information corresponding to one bit or a multi-level cell (MLC) that stores information corresponding to two or more bits. The second memory 380 may include NAND-type flash memory cells arranged in two dimensions. Alternatively, the second memory 380 may include three-dimensional vertical NAND-type flash memory cells or a three dimensional (3D) memory array.

In an embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the inventive concept, the 3D memory array includes vertical NAND strings that are vertically oriented, such that at least one memory cell is located over another memory cell. The at least one memory cell may comprise a charge trap layer.

Examples of suitable configurations for three-dimensional memory arrays, in which the three-dimensional memory array is configured as a plurality of levels, with word lines and/or bit lines shared between levels are described by U.S. Pat. No. 7,679,133 to Son et al. (Mar. 16, 2010); U.S. Pat. No. 8,553,466 to Han et al. (Oct. 8, 2013); U.S. Pat. No. 8,654,587 to Yoon et al. (Feb. 18, 2014); U.S. Pat. No. 8,559,235 to Yoon et al. (Oct. 15, 2013); and U.S. Patent App. Pub. No. 2011/0233648 to Seol et al. (Sep. 29, 2011), all which are hereby incorporated by reference.

One or more channels may be provided between the second memory controller 360 and the second memory 380. Here, the second memory 380 may include one or more memories. Accordingly, a channel may be an independent data path existing between the second memory controller 360 and at least one memory. A path may indicate a group of one or more memories sharing a channel with each other. Accordingly, a plurality of paths may be connected to a single channel.

The CPU 330 generates a compensation code to compensate for an initial threshold voltage shift of flash-based memory cells included in the second memory 380 using a control code output from the compensation circuit 340, and outputs the compensation code to the second memory controller 360. The second memory controller 360 sets or programs the compensation code in the configuration register (e.g., register 387 in FIG. 11) included in the second memory 380. Accordingly, the second memory 380 may compensate for the initial threshold voltage shift using the compensation code and perform a data processing operation using the compensated initial threshold voltage shift.

Here, an initial threshold voltage may be a program voltage, a program-verify voltage, a read voltage, an erase voltage, or an erase-verify voltage, but is not restricted thereto. The control code and the compensation code are named differently, but may be the same code.

Figure 2:
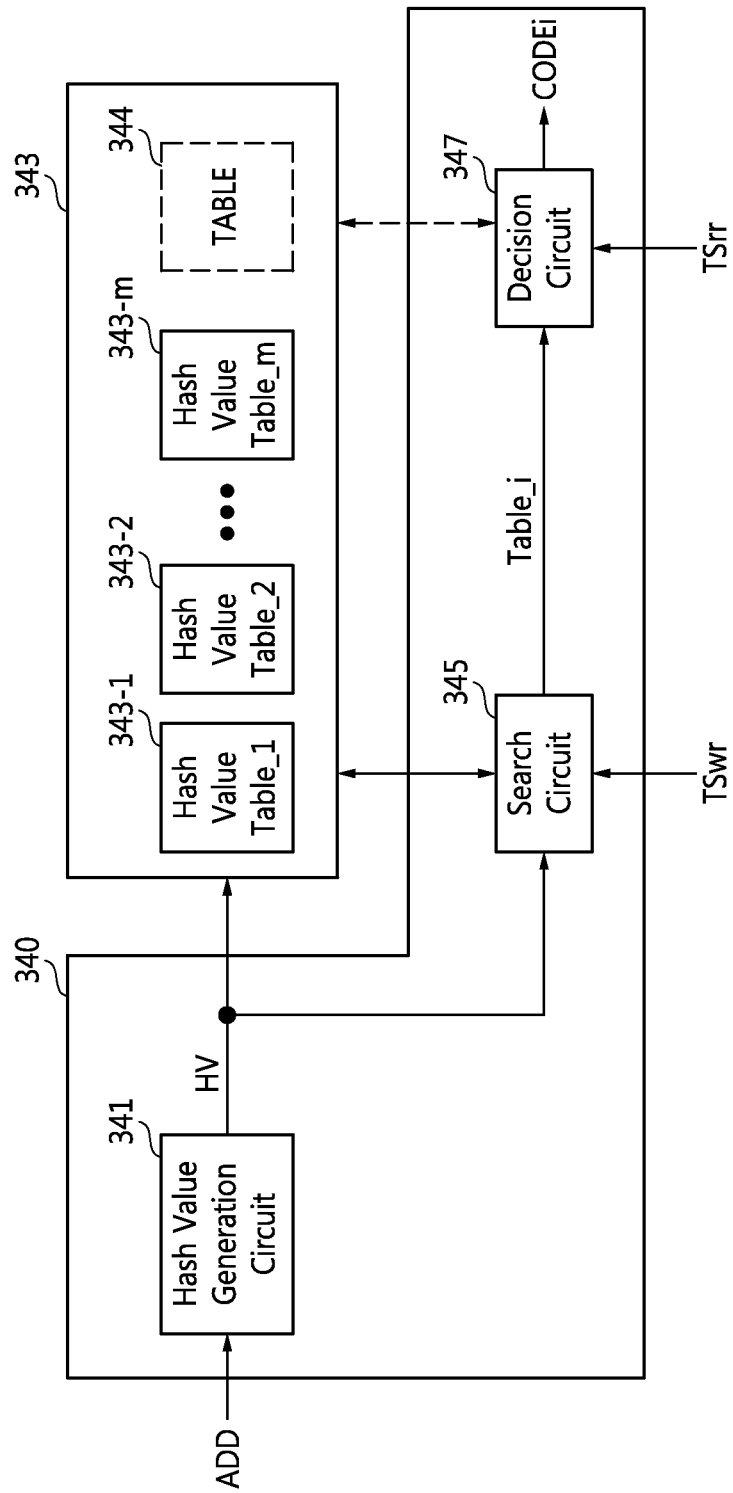
FIG. 2 is a block diagram of a compensation circuit illustrated in FIG. 1, to an embodiment of the inventive concept.

FIG. 2 is a block diagram of the compensation circuit 340 illustrated in FIG. 1, according to an embodiment of the inventive concept. For convenience of description, the compensation circuit 340 and the internal memory 343 are illustrated together in FIG. 2. When the data storage device 300A performs a write operation during a recent predetermined period, the data storage device 300A compresses a write address necessary for the write operation and stores a first compression value corresponding to the compression result in at least one table.

When the data storage device 300A performs a read operation, the data storage device 300A compresses a read address necessary for the read operation, searches for at least one table having the first compression value the same as a second compression value corresponding to the compression result, compensates for an initial threshold voltage shift of flash-based memory cells included in the second memory 380 using an index of the searched table, and performs the read operation using the compensated initial threshold voltage shift. The compression may be hashing, but is not limited thereto. Here, compensating for the initial threshold voltage shift means increasing or decreasing the threshold voltage (e.g., a read voltage).

However, when no table having a first compression value the same as the second compression value corresponding to the compression result is found as a result of searching, the data storage device 300A performs a normal read operation. Here, the normal read operation may be a read operation performed with a default read level. The default read level (e.g., Vdef in FIG. 6) may be a read voltage used in a read operation performed a long time after data is written to the second memory 380.

In the depicted embodiment, the compensation circuit 340 includes a compression value generation circuit, which for purposes of illustration is depicted as hash value generation circuit 341 (although the compression value generation circuit is not limited thereto). The compensation circuit 340 further includes a search circuit 345 and a decision circuit 347. The hash value generation circuit 341 may generate or compute a compression value HV corresponding to an input address ADD during a write or read operation. The input address ADD may be a write address or a read address, respectively.

The compression value HV generated during a write operation is stored in one or more tables 343-1 through 343-*m* included in the internal memory 343. For convenience of description, it is assumed that the compression value HV is stored in one of the tables 343-1 through 343-*m* included in the internal memory 343.

As mentioned above, the compression value generation circuit may be implemented as a hash value generation circuit. In this case, the hash value generation circuit 341 may generate or compute a hash value HV using the write address ADD and store the hash value HV in one of the tables 343-1 through 343-*m* included in the internal memory 343. For the sake of convenience, various embodiments (including figures) are described herein referring to hash values HV, although the descriptions may be considered applicable to compression values HV, as well.

When the data storage device 300A performs a write operation, the search circuit 345 determines in which of the tables 343-1 through 343-m the hash value HV generated using the write address ADD will be stored using a time stamp (hereinafter, referred to as a "write time stamp") TSwr for a write request, and stores the hash value HV in at least one determined table. At this time, the search circuit 345 may function as a write controller. The write time stamp TSwr may include information about the time at which the write request is received by the data storage device 300A. As described above, the write request related to a write operation may include a write address.

When the data storage device 300A performs a read operation, the search circuit 345 searches the tables 343-1 through 343-m for a table that stores a hash value HV the same as a hash value HV generated using a read address ADD, and outputs an index Table_i of the searched table to the decision circuit 347. At this time, the search circuit 345 may function as a read controller.

The decision circuit 347 may compute or estimate a time at which the hash value HV generated using the write address ADD was stored in the table using the table index Table_i output from the search circuit 345, and a time stamp (hereinafter, referred to as a "read time stamp") TSrr for a read request. The decision circuit 347 generates a control code CODEi indicating whether to compensate for an initial threshold voltage shift and a degree of compensation according to the computation result.

Here, the read time stamp TSrr may include information about the time at which the read request is received by the data storage device 300A. As described above, the read request related to a read operation may include a read address. The degree of compensation, i.e., compensation degree, indicates how much of an adjustment is needed to compensate for the shift of the initial threshold voltage (e.g., increase or decrease).

Alternatively, the decision circuit 347 may compute or estimate the time at which the hash value HV generated using the write address ADD is stored in the table using the table index Table_i and the read time stamp TSrr. The decision circuit further retrieves the code CODEi corresponding to the computed time from a code table 344, and outputs the retrieved code CODEi. A procedure for retrieving the code CODEi will be described below with reference to FIG. 8.

As shown in FIG. 2, the internal memory 343 may store a plurality of the tables 343-1 through 343-m, i.e., hash value tables. The internal memory 343 may also include the code table 344 including a plurality of codes indicating compensation information regarding an initial threshold voltage shift. The code table 344 may be loaded from the second memory 380 to the internal memory 343.

Figure 3:
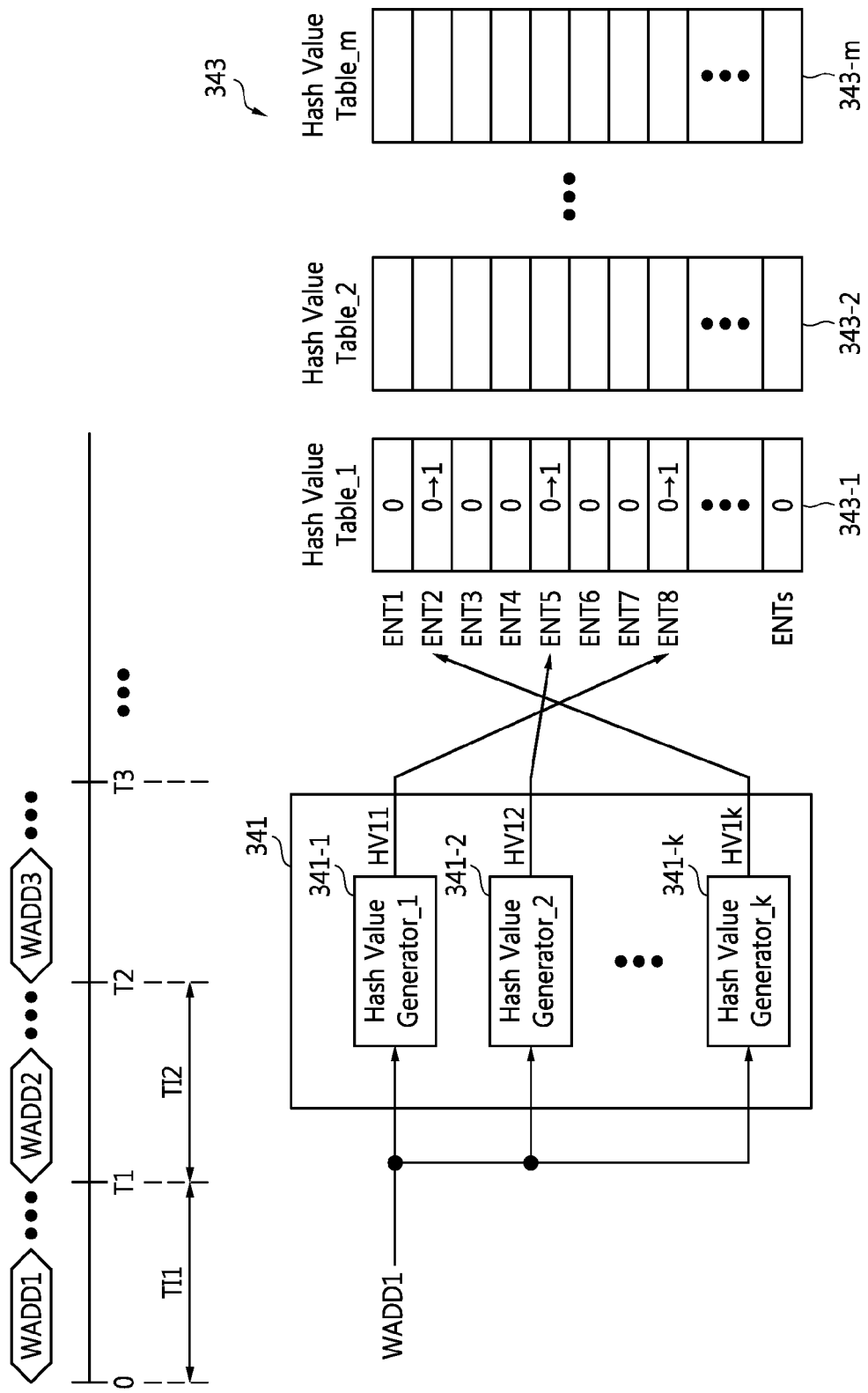
FIG. 3 is a conceptual diagram of an operation of a hash value generation circuit illustrated in FIG. 2, which processes a first write address, according to an embodiment of the inventive concept.

FIG. 3 is a conceptual diagram of an operation of the hash value generation circuit 341 illustrated in FIG. 2, which processes a first write address WADD1, according to an embodiment of the inventive concept. Referring to FIGS. 1 through 3, the hash value generation circuit 341 includes multiple hash value generators 341-1 through 341-k (where "k" is a natural number of at least 2) and the internal memory 343 may store or include the multiple hash value tables 343-1 through 343-m (where "m" is a natural number of at least 2). The hash value tables 343-1 through 343-m may be simply referred to as "hash tables."

The number of the hash value generators 341-1 through 341-k and the number of the hash value tables 343-1 through 343-m may vary with embodiments (for example, k=m or k≠m). The hash value generators 341-1 through 341-k compute different hash values HV11 through HV1k, respectively, using the first write address WADD1 related to a first write request received during a first time interval TH. The first time interval TI1 may be defined by time points 0 and T1. Each of the hash values HV11 through HV1k may include one or more values.

In various embodiments, the hash value generators 341-1 through 341-k may have different seed values. A seed value may be a fixed value or a variable value changing under control of the CPU 330. Alternatively, the hash value generators 341-1 through 341-k may use different hash functions. A hash function may be a function that can be used to map digital data with an arbitrary size to digital data with a fixed size, for example.

Although different write addresses may be input to the hash value generation circuit 341 during the first time interval TIE the operation of the compensation circuit 340 processing hash values for the first write address WADD1, received during the first time interval TI1, will be described herein for the sake of convenience. It is understood that the description is applicable to processing hash values for other write addresses received during other corresponding time intervals.

The hash value generators 341-1 through 341-k generate the different hash values HV11 through HV1k, respectively, using the first write address WADD1. For example, each of the hash value generators 341-1 through 341-k may generate a different hash value using a different write address. In other words, each of the hash value generators 341-1 through 341-k may generate a different hash value for each write address.

The search circuit 345 determines in which of the hash value tables 343-1 through 343-m the different hash values HV11 through HV1k will be stored using a first time stamp TSwr of the first write address WADD1. For example, the search circuit 345 may select the first hash value table 343-1 in which the hash values HV11 through HV1k will be stored. In this example, the first time interval TI1 may correspond to the first hash value table 343-1.

The hash values HV11 through HV1k corresponding to each write address input during the first time interval TI1 may be stored in the first hash value table 343-1. For example, the hash value HV11 generated by the first hash value generator 341-1 may be stored at an entry ENT8 of the first hash value table 343-1; the hash value HV12 generated by the second hash value generator 341-2 may be stored at an entry ENT5 of the first hash value table 343-1; and the hash value HV1k generated by the k-th hash value generator 341-k may be stored at an entry ENT2 of the first hash value table 343-1.

Each of entries ENT1 through ENTs (where "s" is a natural number of at least 2) of the first hash value table 343-1 having a first index Table_1 may be expressed in one bit in order to reduce the size (or data storage capacity) of the internal memory 343, although embodiments of the inventive concept are not restricted to these examples. Logic 0 (or data 0) included in each of the entries ENT1 through ENTs may indicate that a corresponding hash value has not been stored and logic 1 (or data 1) may indicate that a corresponding hash value has been stored.

At the time point T1, the search circuit 345 stops storing the hash values HV11 through HV1k for a write address in the first hash value table 343-1, and initializes the second hash value table 343-2. The search circuit 345 may then prepare to store hash values for a write address input during a second time interval TI2 in the second hash value table 343-2.

Figure 4:
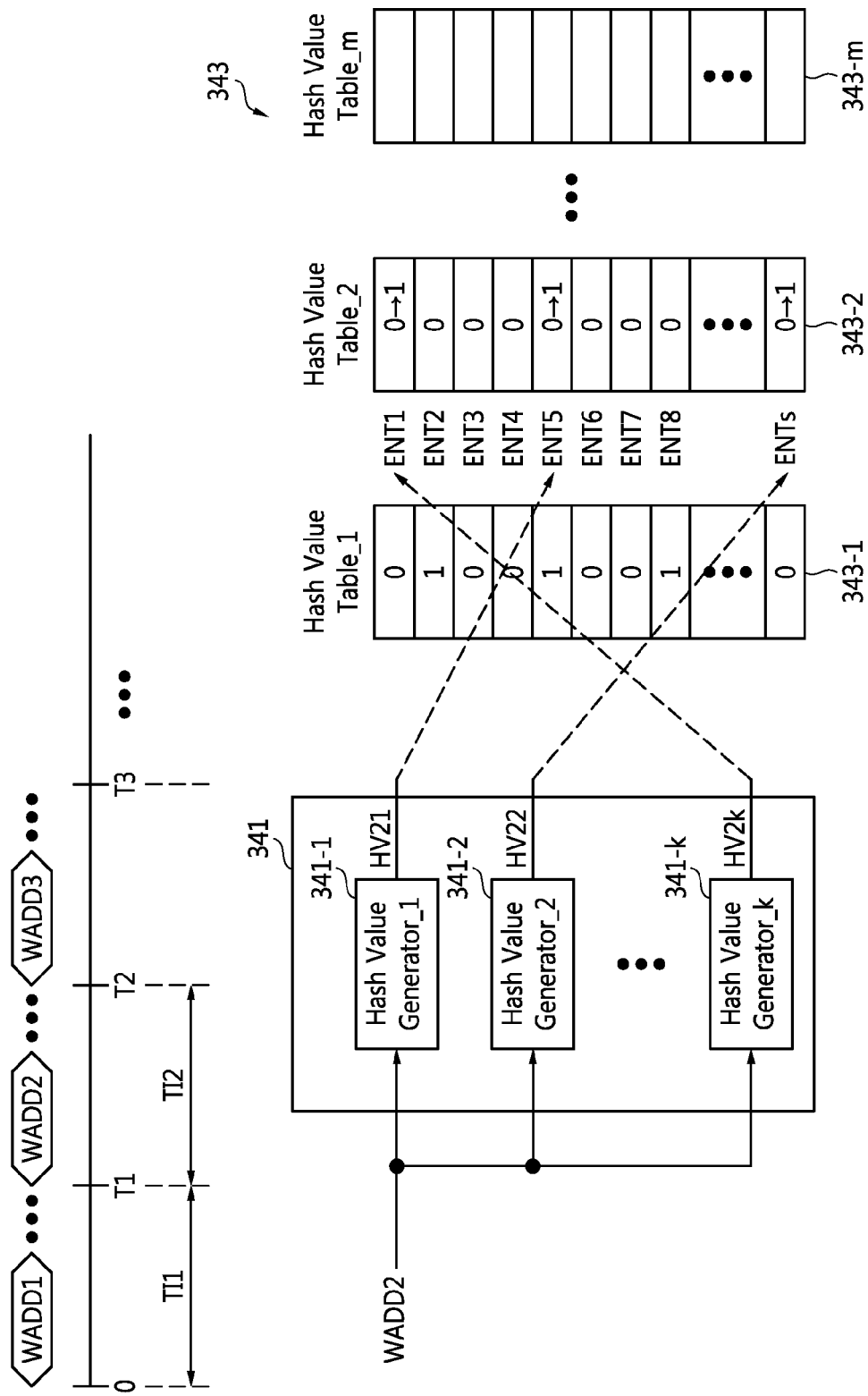
FIG. 4 is a conceptual diagram of an operation of the hash value generation circuit illustrated in FIG. 2, which processes a second write address, according to an embodiment of the inventive concept.

FIG. 4 is a conceptual diagram of an operation of the hash value generation circuit 341 illustrated in FIG. 2, which processes a second write address WADD2, according to an embodiment of the inventive concept. Although different write addresses may be input to the hash value generation circuit 341 during a time interval following the first time interval TI1, i.e., the second time interval TI2, the operation of the compensation circuit 340 that processes hash values for the second write address WADD2 received during the second time interval TI2 will be described herein for the sake of convenience.

The hash value generators 341-1 through 341-k generate different hash values HV21 through HV2k, respectively, using the second write address WADD2. Each of the hash value generators 341-1 through 341-k may generate a different hash value using a different write address.

The search circuit 345 determines in which of the hash value tables 343-1 through 343-m the different hash values HV21 through HV2k will be stored using a second time stamp TSwr of the second write address WADD2. For example, the search circuit 345 may select the second hash value table 343-2 in which the hash values HV21 through HV2k will be stored. The second time interval TI2 may correspond to the second hash value table 343-2. The hash values HV21 through HV2k corresponding to each write address input during the second time interval TI2 defined by time points T1 and T2 may be stored in the second hash value table 343-2.

For example, the hash value HV21 generated by the first hash value generator 341-1 may be stored at an entry ENT5 of the second hash value table 343-2; the hash value HV22 generated by the second hash value generator 341-2 may be stored at an entry ENTs of the second hash value table 343-2; and the hash value HV2k generated by the k-th hash value generator 341-k may be stored at an entry ENT1 of the second hash value table 343-2. Each of entries ENT1 through ENTs of the second hash value table 343-2 having a second index Table_2 may be expressed in one bit in order to reduce the size (or data storage capacity) of the internal memory 343, although embodiments of the inventive concept are not restricted to these examples.

At the time point T2, the search circuit 345 stops storing the hash values HV21 through HV2k for a write address in the second hash value table 343-2, and initializes the third hash value table 343-3. The search circuit 345 may then prepare to store hash values for a write address input during a third time interval TI3 defined by time points T2 and T3 in the third hash value table 343-3.

Processing hash values for a third write address WADD3 is substantially the same as or similar to processing hash values for the second write address WADD2. As described above, hash values for a write address input during a different time interval may be stored in a different hash value table. For example, the first hash value table 343-1 having the first index Table_1 may include information (or data) regarding the first time interval TH. Accordingly, the first hash value table 343-1 may store the hash values HV11 through HV1k for each write address corresponding to the first time interval TH. The second hash value table 343-2 having the second index Table_2 may include information (or data) regarding the second time interval TI2. Accordingly, the second hash value table 343-2 may store the hash values HV21 through HV2k for each write address corresponding to the second time interval TI2. In the same or similar manner, the m-th hash value table 343-m having an m-th index Table_m may include information (or data) regarding an m-th time interval. Accordingly, the m-th hash value table 343-m may store hash values for each write address corresponding to the m-th time interval.

Figure 5:
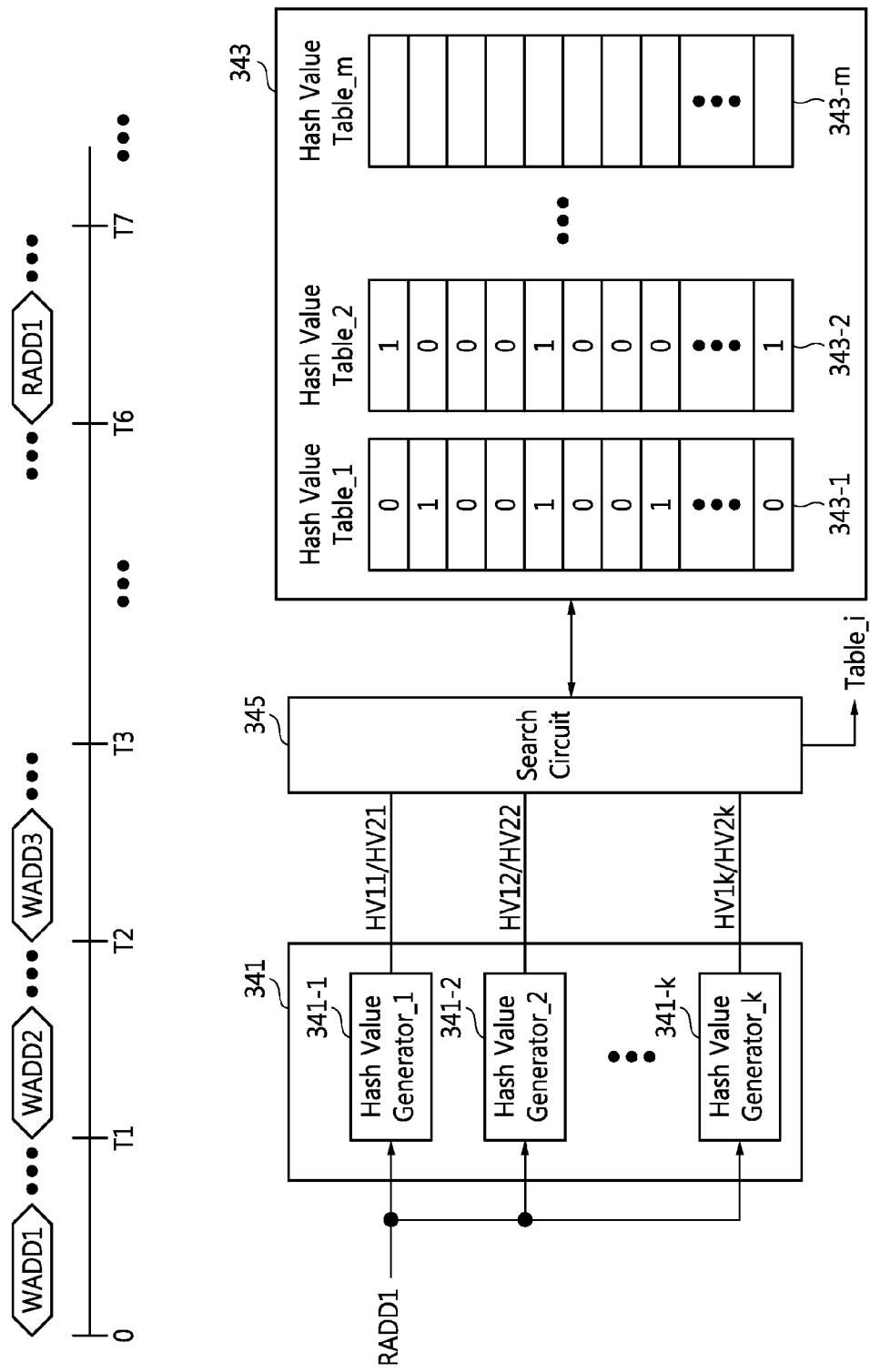
FIG. 5 is a conceptual diagram of an operation of the hash value generation circuit illustrated in FIG. 2, which processes a read address, according to an embodiment of the inventive concept.

FIG. 5 is a conceptual diagram of an operation of the hash value generation circuit 341 illustrated in FIG. 2, which processes a read address RADD1, according to an embodiment of the inventive concept. Although different read addresses may be input through various time intervals, the operation of the compensation circuit 340 that processes hash values for the read address RADD1 input during a time interval defined by representative time points T6 and T7 will be described for the sake of convenience. Each of the hash value generators 341-1 through 341-k may generate a different hash value using the read address RADD1.

In various embodiments, it is assumed that the read address RADD1 is the same as the first write address WADD1. The hash value generators 341-1 through 341-k may generate the different hash values HV11 through HV1k, respectively, using the read address RADD1 (=WADD1).

The search circuit 345 searches the hash value tables 343-1 through 343-m for a hash value table that stores the hash values HV11 through HV1k the same as the hash values HV11 through HV1k corresponding to the read address RADD1 (=WADD1). In particular, the search circuit 345 searches for and/or selects the first hash value table 343-1 from the hash value tables 343-1 through 343-m, and outputs the first index Table_i (=Table_1) for the first hash value table 343-1.

As has been described with reference to FIG. 3, the hash value HV11 corresponds to the entry ENT8 of the first hash value table 343-1; the hash value HV12 corresponds to the entry ENT5 of the first hash value table 343-1; and the hash value HV1k corresponds to the entry ENT2 of the first hash value table 343-1. Therefore, in order to increase of the speed of the search, the search circuit 345 may search only the entry ENT8 corresponding to the hash value HV11, the entry ENT5 corresponding to the hash value HV12, and the entry ENT2 corresponding to the hash value HV1k among the entries ENT1 through ENTs of the hash value tables 343-1 through 343-m.

The search circuit 345 thus may search for the first hash value table 343-1 that stores the hash values HV11 through HV1k the same as the hash values HV11 through HV1k corresponding to the read address RADD1 (=WADD1), and may output the first index Table_i (=Table_1) for the first hash value table 343-1 to the decision circuit 347. The decision circuit 347 decides whether to compensate for an initial threshold voltage shift and, if so, the degree of compensation using a read time stamp TSrr for the read address RADD1 and the first index Table_i (=Table_1), to generate the control code CODEi corresponding to the decision result, and to transmit the control code CODEi to the CPU 330.

In other embodiments, it is assumed that the read address RADD1 is the same as the second write address WADD2 (or some other write address). The hash value generators 341-1 through 341-k may generate the different hash values HV21 through HV2k, respectively, using the read address RADD1 (=WADD2).

The search circuit 345 searches the hash value tables 343-1 through 343-m for a hash value table that stores the hash values HV21 through HV2k the same as the hash values HV21 through HV2k corresponding to the read address RADD1 (=WADD2). In particular, the search circuit 345 searches for and/or selects the second hash value table 343-2 from the hash value tables 343-1 through 343-m, and outputs the second index Table_i (=Table_2) for the second hash value table 343-2 to the decision circuit 347.

As has been described with reference to FIG. 4, the hash value HV21 corresponds to the entry ENT5 of the second hash value table 343-2; the hash value HV22 corresponds to the entry ENTs of the second hash value table 343-2; and the hash value HV2k corresponds to the entry ENT1 of the second hash value table 343-2. Therefore, in order to increase speed of the search, the search circuit 345 may search only the entry ENT5 corresponding to the hash value HV21, the entry ENTs corresponding to the hash value HV22, and the entry ENT1 corresponding to the hash value HV2k among the entries ENT1 through ENTs of the hash value tables 343-1 through 343-m.

The search circuit 345 searches for the second hash value table 343-2 that stores the hash values HV21 through HV2k the same as the hash values HV21 through HV2k corresponding to the read address RADD1 (=WADD2), and outputs the second index Table_i (=Table_2) for the second hash value table 343-2 to the decision circuit 347. The decision circuit 347 decides whether to compensate for an initial threshold voltage shift and, if so, the degree of compensation using the read time stamp TSrr for the read address RADD1 and the second index Table_i (=Table_2), to generate the control code CODEi corresponding to the decision result, and to transmit the control code CODEi to the CPU 330.

Figure 6:
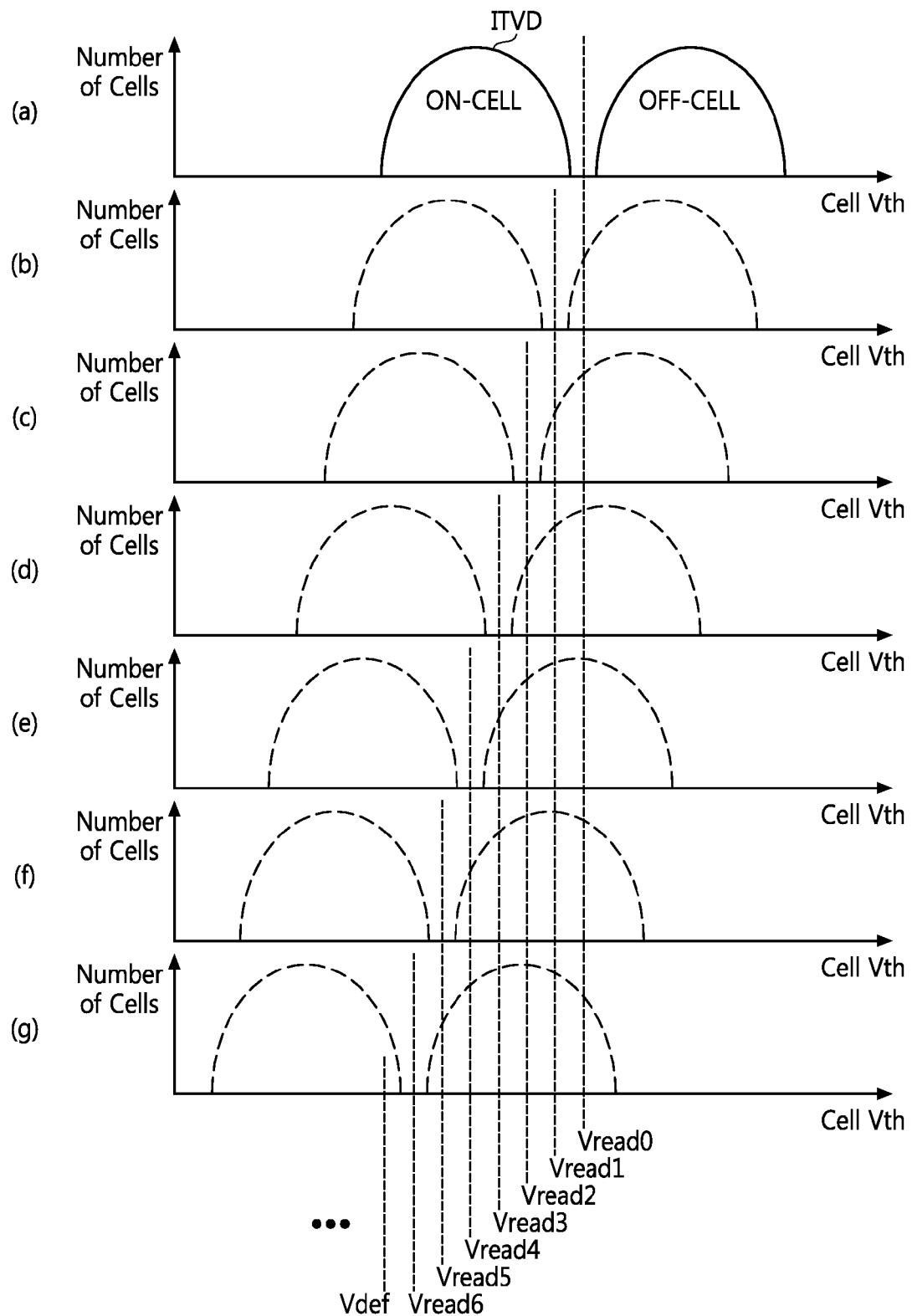
FIG. 6 is a conceptual diagram of a shift in an initial threshold voltage distribution over time.

FIG. 6 is a conceptual diagram showing shifts in initial threshold voltage distribution (ITVD) over time. Referring to graphs (a) through (g) in FIG. 6, the initial threshold voltage distribution (ITVD) of flash-based memory cells, e.g., included in the second memory 380, may shift due to various factors. For example, the ITVD may shift based on the number of P/E cycles, read count, and/or use time.

In FIG. 6, Vread0 denotes a first read voltage level with respect to the ITVD. For example, the left side of the first read voltage level Vread0 may represent the ITVD of on-cells ON-CELL and the right side of the first read voltage level Vread0 may represent the ITVD of off-cells OFF-CELL. Thus, the first read voltage level Vread0 may be an initial read voltage level. The ITVD shifts from graph (a) to graph (g) in FIG. 6 according to the number of P/E cycles, read count, and/or use time, for example.

In the embodiment depicted in FIG. 6, the read voltages Vread0 through Vread6 are different, although this is just an example. Two or more of the read voltages Vread0 through Vread6 may be the same in other embodiments. Also, relative differences between the read voltages Vread0 through Vread6 may be the same or different. A reference character "Vdef" denotes a default read voltage.

Figure 7:
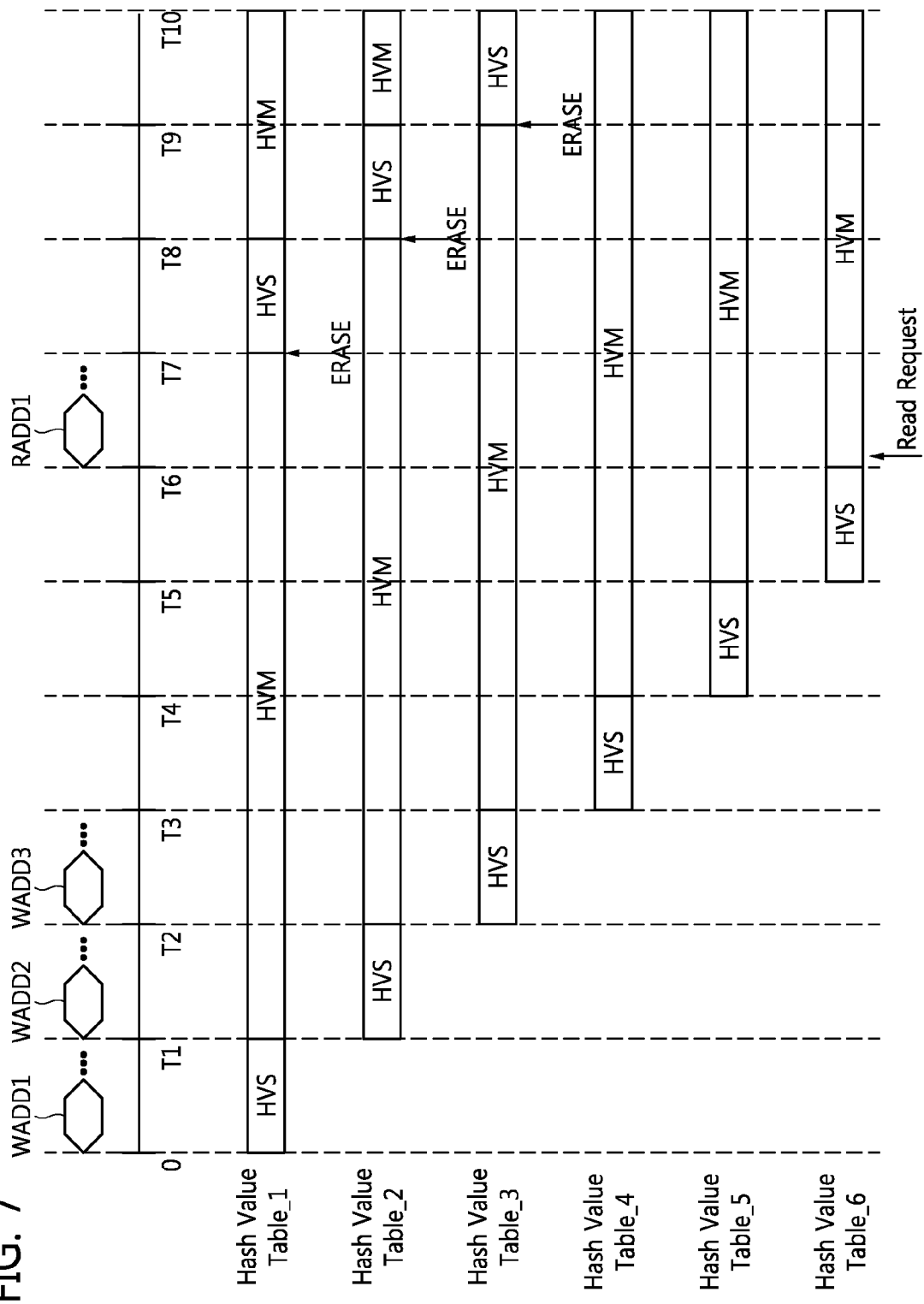
FIG. 7 is a conceptual diagram of a time interval of a compression value for a write address stored in a hash table, according to an embodiment of the inventive concept.

FIG. 7 is a conceptual diagram of time intervals of compression values for write addresses stored in hash value tables, according to an embodiment of the inventive concept. For purposes of illustration, it is assumed that the number of the hash value tables 343-1 through 343-m is six (e.g., corresponding to Hash Value Table_1 to Hash Value Table_6), although this number may vary according to different embodiments.

Referring to FIGS. 2 through 5 and FIG. 7, reference character "HVS" denotes a time interval when hash values for a write address, corresponding to each of the hash value tables 343-1 through 343-6 defined for respective time intervals, are stored. Reference character "HVM" denotes a time interval when the hash values stored during the time interval HVS are maintained without new hash values being stored in each of the hash value tables 343-1 through 343-6.

Reference character "ERASE" denotes an erase operation or an initialization operation performed on each of the hash value tables 343-1 through 343-6.

Hash values stored in the hash value tables 343-1 through 343-6 may be initialized at predetermined intervals. Accordingly, the hash value tables 343-1 through 343-6 may store hash values only corresponding to a write address that has recently been input. Time intervals defined by two time points, e.g., time points 0 and T1, T1 and T2, T2 and T3, . . . , may be designed to be uniform or may be different from one another.

Figure 11:
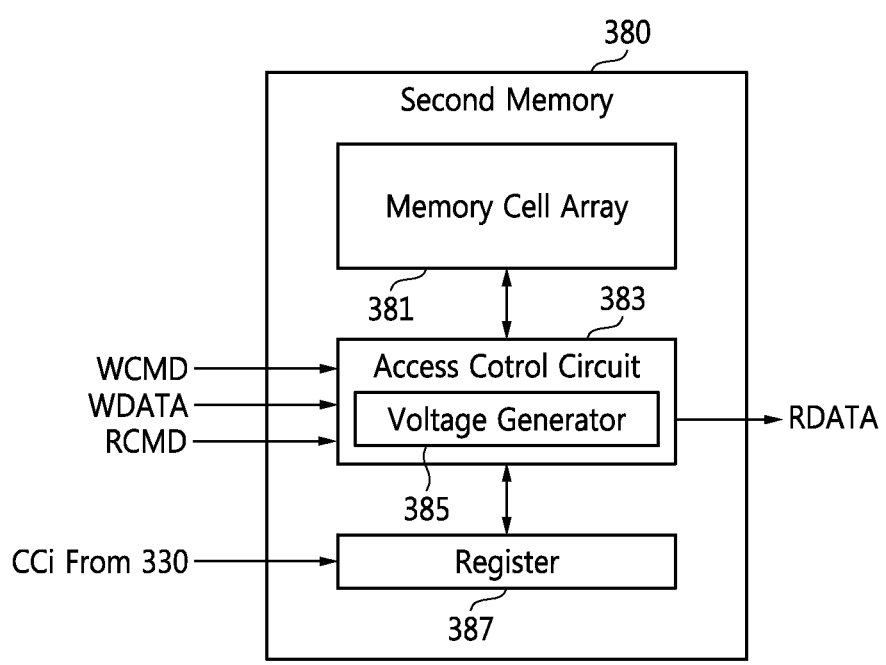
FIG. 11 is a block diagram of a second memory illustrated in FIG. 1 or 9, according to an embodiment of the inventive concept.

FIG. 8 is a conceptual diagram of a table for compensating for an initial threshold voltage distribution shift, according to an embodiment of the inventive concept. FIG. 11 is a block diagram of the second memory 380 illustrated in FIG. 1 or 9, according to an embodiment of the inventive concept. Referring to FIGS. 1 through 8 and FIG. 11, when the data storage device 300A receives a read request from the host 200 in a time interval defined by time points T6 and T7, the CPU 330 generates the read time stamp TSrr for the read request and outputs the read time stamp TSrr to the compensation circuit 340, and more particularly, to the decision circuit 347. The CPU 330 may also generate the write time stamp TSwr for a write request and output the write time stamp TSwr to the compensation circuit 340, and more particularly, to the search circuit 345.

As has been described with reference to FIG. 5, when the read address RADD1 is the same as the first write address WADD1, the search circuit 345 outputs the first index Table_i (=Table_1) of the first hash value table 343-1 to the decision circuit 347.

The decision circuit 347 may estimate a time when hash values corresponding to the first write address WADD1 were stored in the first hash value table 343-1 using the read time stamp TSrr and the first index Table_1. The time may substantially the same or similar to a time when first write data WDATA corresponding to the first write address WADD1 was written to a memory cell array 381 of the second memory 380, shown in FIG. 11.

For example, when a time defined by the read time stamp TSrr is referred to as Tread, the decision circuit 347 may estimate or decide that the first write data WDATA corresponding to the first write address WADD1 was programmed to the memory cell array 381 of the second memory 380 between Tread seconds before and (Tread−T1) seconds before. Accordingly, the decision circuit 347 transmits a first code CODE1 instructing to shift to the seventh read voltage Vread6 higher than the default read voltage Vdef to the CPU 330 as the control code CODE1.

The CPU 330 generates a compensation code CCi corresponding to the control code CODEi (=CODE1), and sets or programs the compensation code CCi in a register 387 of the second memory 380 using the second memory controller 360. As described above, the control code CODEi (=CODE1) may be the same as the compensation code CCi.

As shown in FIG. 11, the second memory 380 includes a memory cell array 381, an access control circuit 383, and a register 387. The memory cell array 381 may include a plurality of memory cells, and the memory cells may include flash-based memory cells, for example. The flash-based memory cells may be NAND-type flash memory cells or NOR-type flash memory cells. Each of the flash-based memory cells may be an SLC that stores information corresponding to one bit, or an MLC that stores information corresponding to two bits or more.

The memory cell array 381 may include NAND-type flash memory cells arranged in two dimensions. Alternatively, the second memory 380 may include three-dimensional vertical NAND-type flash memory cells or a three dimensional (3D) memory array.

The access control circuit 383 may control program operations, read operations, and/or erase operations of the memory cell array 381 under control of the second memory controller 360. The CPU 330 may generate a command (e.g., a write command WCMD or a read command RCMD) for controlling the operation of the second memory controller 360 in response to a request (e.g., a write request or a read request) received from the host 200.

The access control circuit 383 includes a voltage generator 385 that generates voltages necessary for the program operation, the read operation or the erase operation. The voltage generator 385 may adjust (e.g., increase or decrease) the voltages necessary for the read operation using the compensation code CCi stored in the register 387. Here, adjust may mean change. When digital signals corresponding to the compensation code CCi are set in the register 387, the voltage generator 385 may generate the seventh read voltage Vread6 corresponding to the control code CODEi (=CODE1), in the present example.

The access control circuit 383 reads data from a memory region corresponding to the first read address RADD1 (=WADD1) in the memory cell array 381 using the seventh read voltage Vread6 generated by the voltage generator 385, and transmits read data RDATA to the second memory controller 360. The second memory controller 360 may transmit the read data RDATA to the host 200 through the bus architecture 311, the second interface 320, and the interface 110 under control of the CPU 330.

In other embodiments, when the read address RADD1 is the same as the second write address WADD2, for example, the search circuit 345 outputs the second index Table_i (=Table_2) of the second hash value table 343-2 to the decision circuit 347.

The decision circuit 347 may estimate a time when hash values corresponding to the second write address WADD2 were stored in the second hash value table 343-2 using the read time stamp TSrr and the second index Table_2. The time may be substantially the same or similar to a time when second write data WDATA corresponding to the second write address WADD2 was written to the memory cell array 381 of the second memory 380.

For example, when a time defined by the read time stamp TSrr is referred to as Tread, the decision circuit 347 decides that the second write data WDATA corresponding to the second write address WADD2 was programmed to the memory cell array 381 of the second memory 380 between (Tread−T1) seconds before and (Tread−T2) seconds before. Accordingly, the decision circuit 347 may transmit a second code CODE2 instructing to shift to the sixth read voltage Vread5 higher than the default read voltage Vdef to the CPU 330 as the control code CODEi.

The CPU 330 generates the compensation code CCi corresponding to the control code CODEi (=CODE2), and sets or programs the compensation code CCi in the register 387 of the second memory 380 using the second memory controller 360. As described above, the control code CODEi (=CODE2) may be the same as the compensation code CCi.

The voltage generator 385 may adjust (e.g., increase or decrease) the voltages necessary for the read operation using the compensation code CCi stored in the register 387. The register 387 is an example of a storage device that can store the compensation code CCi. The register 387 may be implemented as a special function register (SFR), although embodiments of the inventive concept are not restricted to this example.

When digital signals corresponding to the compensation code CCi are set in the register 387, the voltage generator 385 generates the sixth read voltage Vread5 corresponding to the control code CODEi (=CODE2).

The access control circuit 383 reads data from a memory region corresponding to the read address RADD1 (=WADD2) in the memory cell array 381 using the sixth read voltage Vread5 generated by the voltage generator 385, and transmits read data RDATA to the second memory controller 360. The second memory controller 360 may transmit the read data RDATA to the host 200 through the bus architecture 311, the second interface 320, and the interface 110 under control of the CPU 330.

In still other embodiments, when the search circuit 345 outputs a third index Table_i (=Table_3) of the third hash value table 343-3 to the decision circuit 347, the decision circuit 347 transmits a third code CODE3 as the control code CODEi to the CPU 330, instructing a shift to the fifth read voltage Vread4, higher than the default read voltage Vdef, using the read time stamp TSrr and the third index Table_3. For example, when a time defined by the read time stamp TSrr is referred to as Tread, the decision circuit 347 may decide that write data corresponding to a write address was programmed to the memory cell array 381 of the second memory 380 between (Tread−T2) seconds before and (Tread−T3) seconds before.

The CPU 330 sets or programs the compensation code CCi corresponding to the control code CODEi (=CODE3) in the register 387 of the second memory 380 using the second memory controller 360. The voltage generator 385 may adjust (e.g., increase or decrease) the voltages necessary for a read operation using the compensation code CCi stored in the register 387.

When digital signals corresponding to the compensation code CCi are set in the register 387, the voltage generator 385 generates the fifth read voltage Vread4 corresponding to the control code CODEi (=CODE3). The access control circuit 383 performs the read operation corresponding to a read request output from the host 200 using the fifth read voltage Vread4 generated by the voltage generator 385.

In further embodiments, when the search circuit 345 outputs a sixth index Table_i (=Table_6) of the sixth hash value table 343-6 to the decision circuit 347, the decision circuit 347 transmits a sixth code CODE6 as the control code CODEi to the CPU 330, instructing a shift to the second read voltage Vread1, higher than the default read voltage Vdef, using the read time stamp TSrr and the sixth index Table_6.

For example, when a time defined by the read time stamp TSrr is referred to as Tread, the decision circuit 347 may decide that write data corresponding to a write address was programmed to the memory cell array 381 of the second memory 380 between (Tread−T5) seconds before and (Tread−T6) seconds before.

The CPU 330 sets or programs the compensation code CCi corresponding to the control code CODEi (=CODE6) in the register 387 of the second memory 380 using the second memory controller 360. The voltage generator 385 may adjust (e.g., increase or decrease) the voltages necessary for a read operation using the compensation code CCi stored in the register 387.

When digital signals corresponding to the compensation code CCi are set in the register 387, the voltage generator 385 generates the second read voltage Vread1 corresponding to the control code CODEi (=CODE6). The access control circuit 383 may perform the read operation corresponding to a read request output from the host 200 using the second read voltage Vread1 generated by the voltage generator 385.

However, when the search circuit 345 outputs an index Table_0 set by default to the decision circuit 347 according to a search result, that is, when no hash table including the same hash values as hash values corresponding to the read address RADD1 is found, the decision circuit 347 transmits a seventh code CODE7 as the control code CODEi to the CPU 330, instructing maintaining of the first read voltage Vread0, using the read time stamp TSrr and the default index Table_0.

The CPU 330 sets or programs the compensation code CCi corresponding to the control code CODEi (=CODE7) in the register 387 of the second memory 380 using the second memory controller 360. The voltage generator 385 does not adjust (e.g., increase or decrease) the voltages necessary for a read operation based on the compensation code CCi stored in the register 387 (i.e., no compensation).

When digital signals corresponding to the compensation code CCi are set in the register 387, the voltage generator 385 generates the first read voltage Vread0 corresponding to the control code CODEi (=CODE7). The access control circuit 383 may perform the read operation corresponding to a read request output from the host 200 using the first read voltage Vread0 generated by the voltage generator 385.

Figure 9:
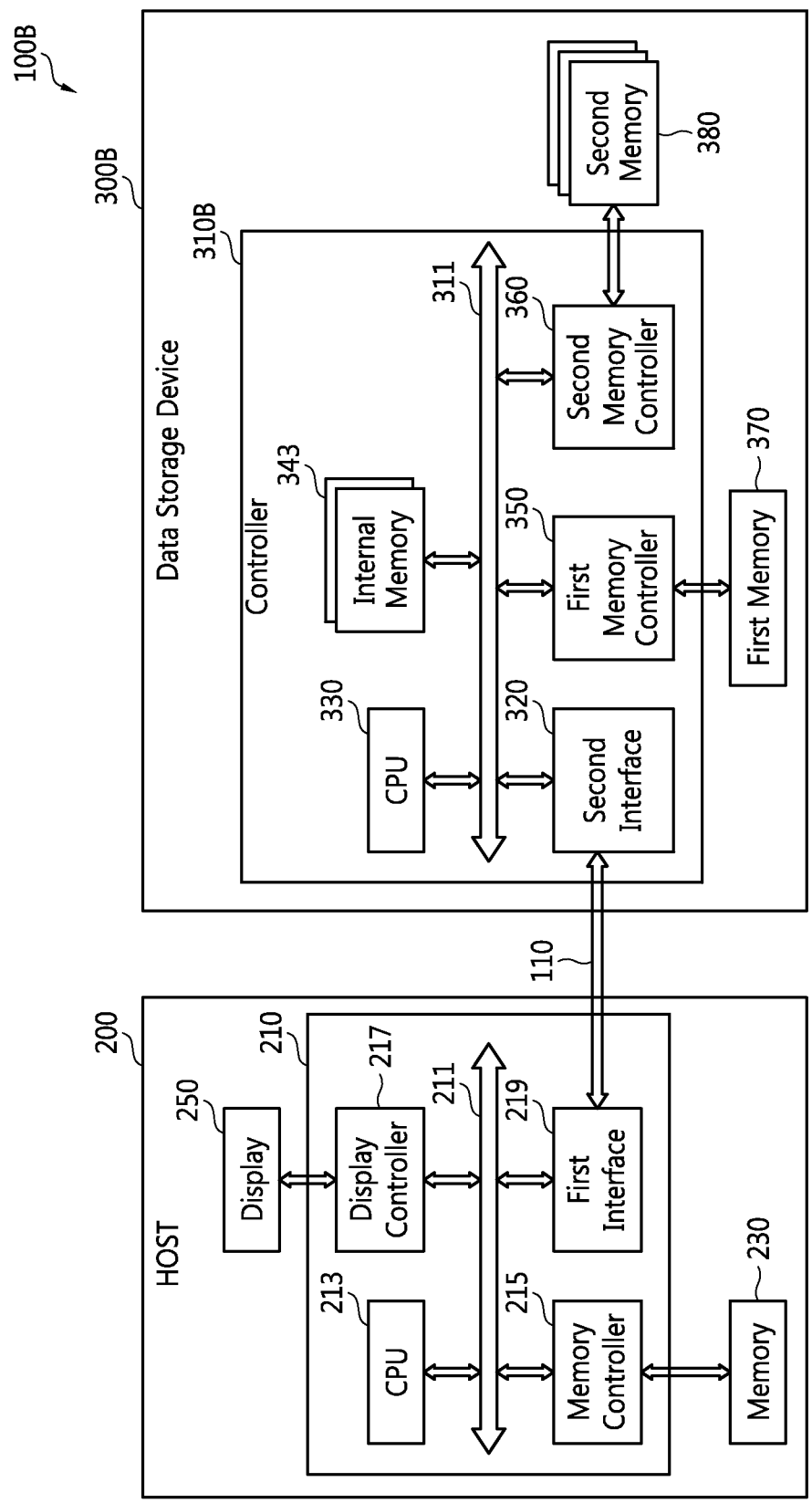
FIG. 9 is a block diagram of a data processing system, according to another embodiment of the inventive concept.

FIG. 9 is a block diagram of a data processing system 100B according to another embodiment of the inventive concept. Referring to FIG. 9, the data processing system 100B includes a host 200 and a data storage device 300B which are connected to each other via an interface 110. The structure and operations of the host 200 illustrated in FIG. 9 are substantially the same as those of the host 200 illustrated in FIG. 1. Thus, the descriptions of the structure and operations of the host 200 illustrated in FIG. 9 will not be repeated.

The data storage device 300B includes a controller 310B, a first memory 370, and a second memory 380. The data storage device 300B may be implemented as a flash-based memory device. For example, the data storage device 300B may be implemented as SSD, eSSD, UFS, MMC, or eMMC, although embodiments of the inventive concept are not restricted to these examples.

The controller 310B controls commands and/or data transferred among the host 200, the first memory 370, and the second memory 380. The commands may be referred to as requests.

Apart from the compensation circuit 340 implemented in hardware, the structure and operations of the controller 310B illustrated in FIG. 9 are substantially the same as those of the controller 310A illustrated in FIG. 1. In FIG. 9, however, the function of the compensation circuit 340 may be performed by a program or software run by the CPU 330.

Figure 10:
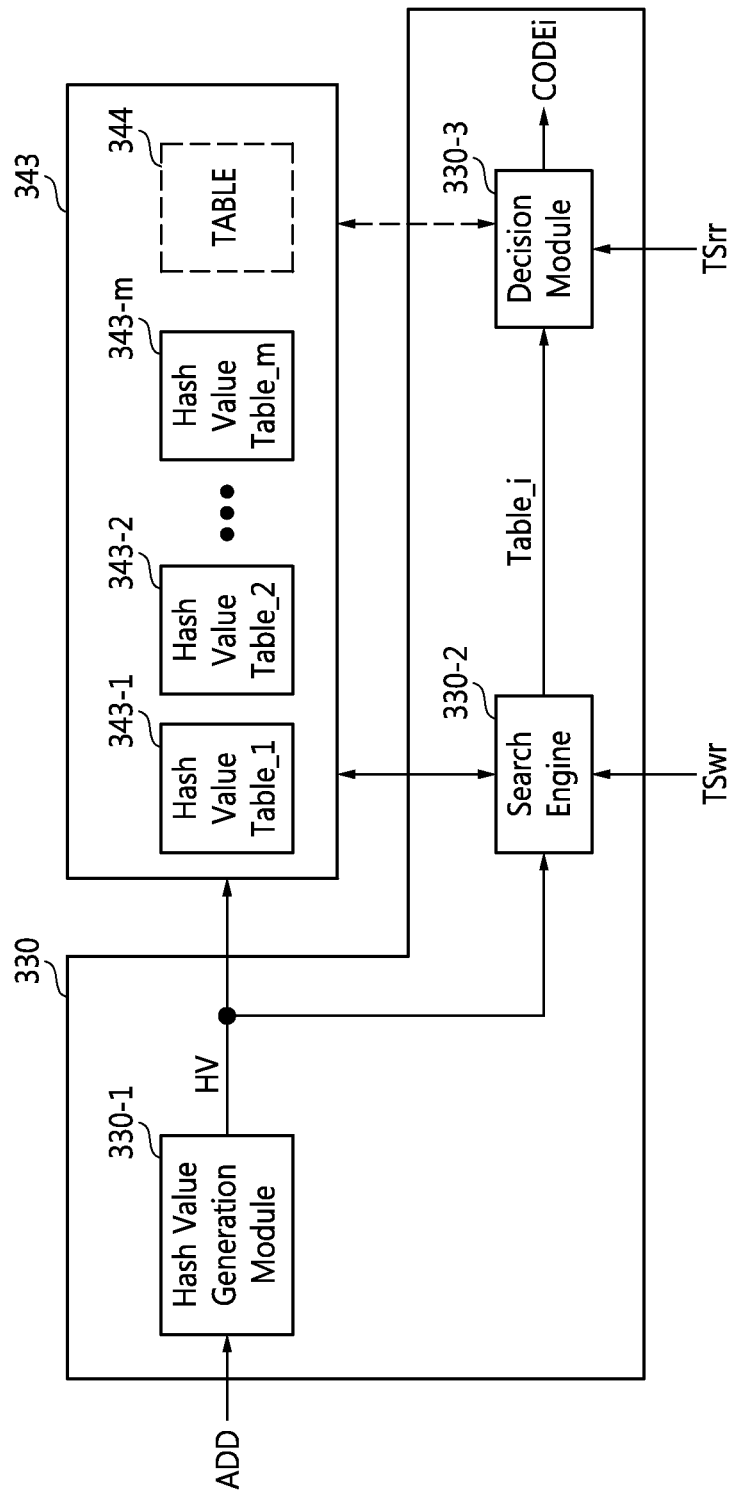
FIG. 10 is a conceptual diagram of an operation of a compensation module run in a central processing unit (CPU) illustrated in FIG. 1, according to an embodiment of the inventive concept.

FIG. 10 is a conceptual diagram of an operation of a compensation module run in the CPU 330 illustrated in FIG. 1, according to an embodiment of the inventive concept. Referring to FIGS. 1, 2, 9, and 10, the function of the hash value generation circuit 341 illustrated in FIG. 2 may be performed by a hash value generation module 330-1 run in the CPU 330, the function of the search circuit 345 illustrated in FIG. 2 may be performed by a search engine 330-2 run in the CPU 330, and the function of the decision circuit 347 illustrated in FIG. 2 may be performed by a decision module 330-3 run in the CPU 330. Here, the term "module" may indicate computer program code effectively dedicated to performing the identified functions and operations described herein.

The hash value generation module 330-1 may generate or compute the compression value HV corresponding to the input address ADD during a write or read operation. The compression value HV generated during the write operation is stored in one of the tables 343-1 through 343-m included in the internal memory 343.

When the data storage device 300B performs a write operation, the search engine 330-2 determines in which of the tables 343-1 through 343-m the hash value HV generated using the write address ADD will be stored using the write time stamp TSwr generated by the CPU 330, and stores the hash value HV in at least one determined table. When the data storage device 300B performs a read operation, the search engine 330-2 searches the tables 343-1 through 343-m for a table that stores the hash value HV the same as the hash value HV generated using the read address ADD, and outputs the index Table_i of the searched table to the decision module 330-3.

The decision module 330-3 may compute or estimate a time at which the hash value HV generated using the write address ADD was stored in the table using the table index Table_i output from the search engine 330-2 and the read time stamp TSrr generated by the CPU 330, and generates the control code CODEi indicating whether to compensate for an initial threshold voltage shift and, if so, the degree of compensation according to the computation result.

Figure 12:
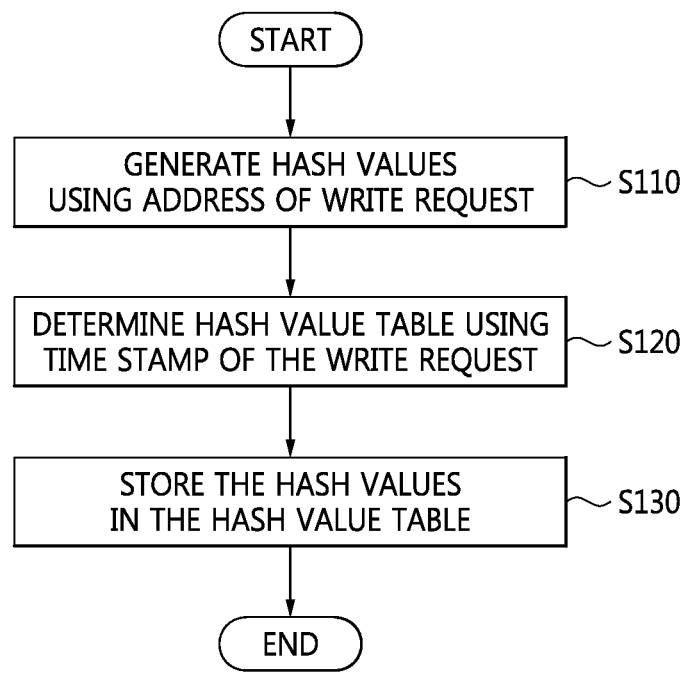
FIG. 12 is a flowchart of a write operation performed in a data storage device illustrated in FIG. 1 or 9, according to an embodiment of the inventive concept.

FIG. 12 is a flowchart of a write operation performed in the data storage device 300A or 300B illustrated in FIG. 1 or 9. Referring to FIGS. 1 through 12, in a write operation, the hash value generation circuit 341 or the hash value generation module 330-1 generates hash values HV using the write address ADD corresponding to a write request in operation S110.

The search circuit 345 or the search engine 330-2 determines in which of the hash value tables 343-1 through 343-m the hash values HV will be stored using the write time stamp TSwr of the write request in operation S120. The search circuit 345 or the search engine 330-2 stores the hash values HV in a hash value table that has been determined or selected by the determination in operation S130.

The second memory controller 360 transmits the write command WCMD corresponding to the write request and the write data WDATA corresponding to the write address ADD to the second memory 380 under the control of the CPU 330. The access control circuit 383 of the second memory 380 may write the write data WDATA to a memory region corresponding to the write address ADD in the second memory 380 in response to the write command WCMD.

Figure 13:
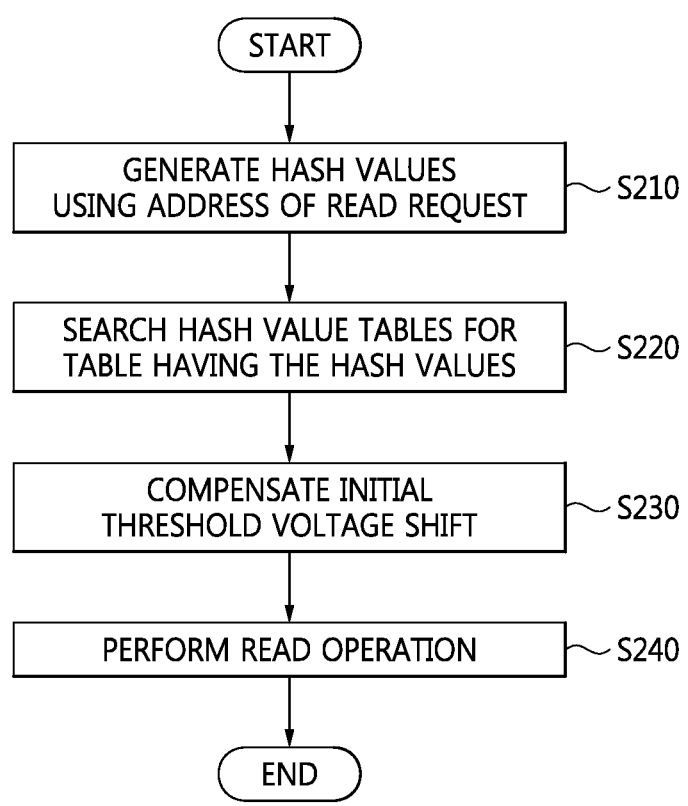
FIG. 13 is a flowchart of a read operation performed in the data storage device illustrated in FIG. 1 or 9, according to an embodiment of the inventive concept.

FIG. 13 is a flowchart of a read operation performed in the data storage device 300A or 300B illustrated in FIG. 1 or 9. Referring to FIGS. 1 through 13, in a read operation, the hash value generation circuit 341 or the hash value generation module 330-1 generates the hash values HV using the read address ADD corresponding to a read request in operation S210.

The search circuit 345 or the search engine 330-2 searches the hash value tables 343-1 through 343-m for a hash value table having values the same as the hash values HV corresponding to the read address ADD and transmit the index Table_i of the searched hash value table to the decision circuit 347 or the decision module 330-3 in operation S220.

The decision circuit 347 illustrated in FIG. 2 may generate the control code CODEi using the index Table_i of the searched hash value table and the read time stamp TSrr, and transmit the control code CODEi to the CPU 330. Alternatively, the decision circuit 347 may refer to the code table 344 to generate the control code CODEi. The CPU 330 generates the compensation code CCi corresponding to the control code CODEi.

The decision module 330-3 illustrated in FIG. 10 may generate the compensation code CCi using the index Table_i of the searched hash value table and the read time stamp TSrr. Alternatively, the decision module 330-3 may refer to the code table 344 to generate the compensation code CCi.

The compensation code CCi may be stored in the register 387 of the second memory 380 under control of the second memory controller 360. The voltage generator 385 may generate a voltage for compensating for an initial threshold voltage shift or initial threshold voltage distribution shift using digital signals included in the compensation code CCi stored in the register 387 in operation 5230. The compensating for the initial threshold voltage shift or the initial threshold voltage distribution shift means increasing or decreasing the voltage (e.g., read voltage). The access control circuit 383 may perform a read operation by reading data from the memory cell array 381 using the adjusted voltage level in response to the read command RCMD corresponding to the read request in operation 5240.

Figure 14:
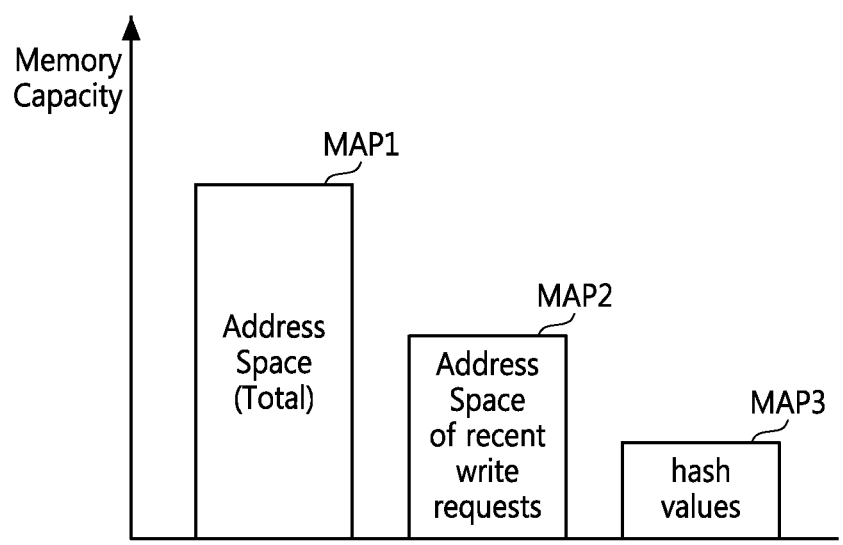
FIG. 14 is a diagram of memory capacities used in a conventional method and a method according to various embodiments of the inventive concept.

FIG. 14 is a diagram of memory capacities used in a conventional method and a method according to various embodiments of the inventive concept. Reference character MAP1 denotes a memory capacity required to include a time stamp table that stores a time stamp assigned for each block or word line in the conventional method. In other words, a time stamp is assigned for each block or word line in the conventional method. The time stamp includes a plurality of bits.

As the capacity of the memory cell array 381 increases, the number of blocks or word lines in the memory cell array 381 also increases. As the number of blocks or word lines increases, the number of time stamps also increases, which increases the size of the time stamp table storing the time stamps.

Reference character MAP2 denotes a memory capacity required to include a time stamp table that stores time stamps only for addresses input during a predetermined time interval according to various embodiments of the inventive concept. The number of addresses input during the predetermined time interval is smaller than the number of addresses for all word lines included in the memory cell array 381. As shown in FIG. 14, the memory capacity MAP2 is smaller than the memory capacity MAP1.

Reference character MAP3 denotes a memory capacity required to include a hash value table that stores compression values (e.g., hash values) only for addresses input during a predetermined time interval according to other embodiments of the inventive concept. As shown in FIG. 14, the memory capacity MAP3 is much smaller than the capacities MAP1 and MAP2. In other words, as compared to the conventional method in which a predetermined number of bits are assigned for each address, only compression values (or hash values) for addresses input during a predetermined time interval are stored in the internal memory 343 in the current embodiments of the inventive concept.

Consequently, the data storage device 300A or 300B includes hash value tables storing compression values (e.g., hash values) only for write addresses input during a predetermined time interval, so that the data storage device 300A or 300B can store the write addresses, for which compensation for an initial threshold voltage shift is required, using less capacity of the internal memory 343.

Figure 15:
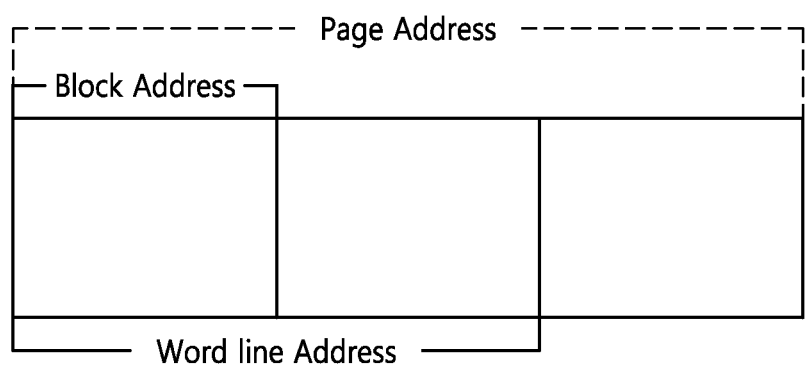
FIG. 15 is a diagram illustrating the definition of an address, according to various embodiments of the inventive concept.

FIG. 15 is a diagram illustrating the definition of an address, according to various embodiments of the inventive concept. Referring to FIG. 15, the size of a page address corresponding to a page is greater than that of an address corresponding to a word line. The size of the word line address is greater than that of a block address corresponding to a block. A flash-based memory may perform a program operation and a read operation in units of pages and may perform an erase operation in units of blocks. A block may be a group of pages.

For example, when MLCs included in the second memory 380 include 2-bit information, a page address may include an address indicating either a least significant bit (LSB) or a most significant bit (MSB) and a word line address.

The hash value generation circuit 341 or the hash value generation module 330-1 may generate hash values using a page address, a word line address, or a block address.

Figure 16:
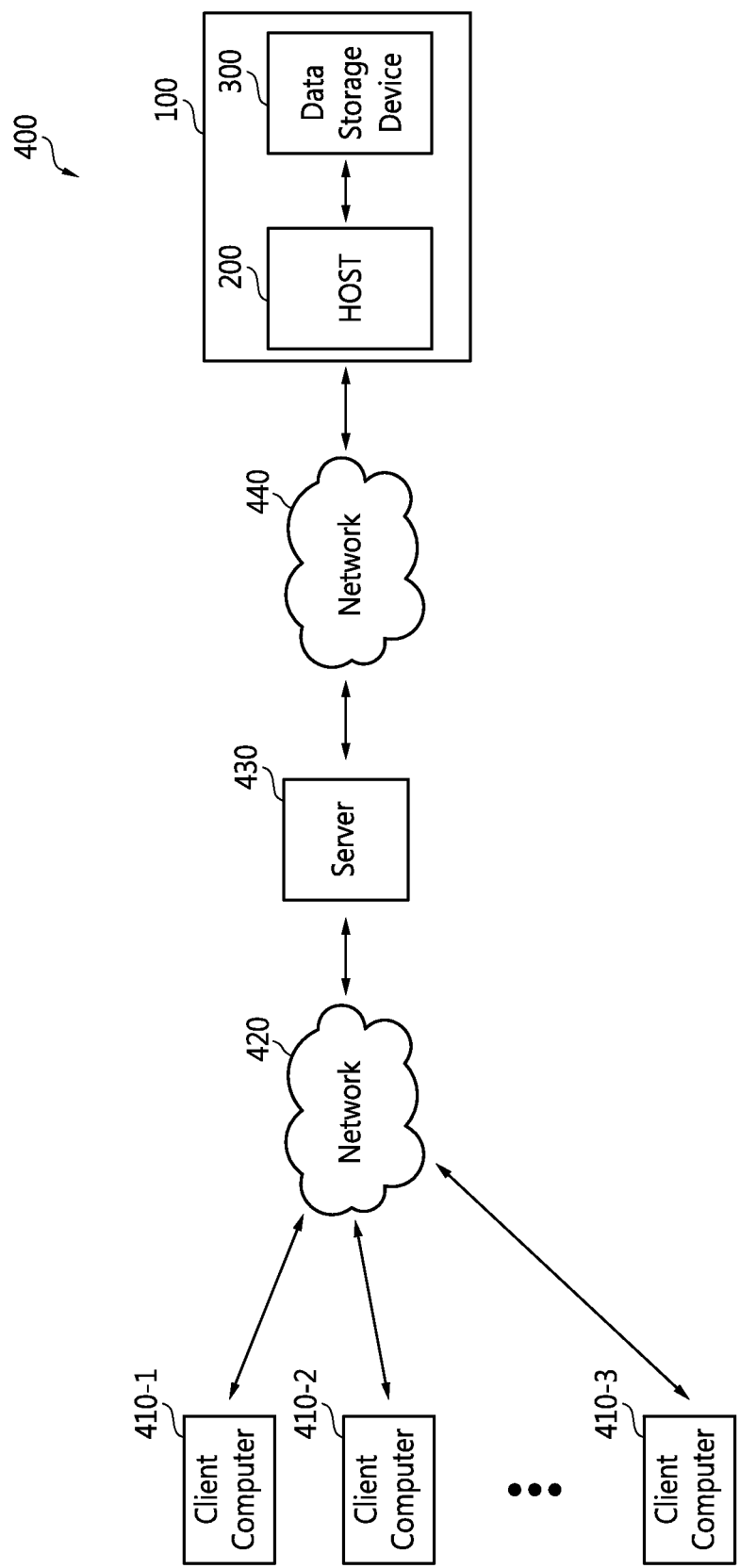
FIG. 16 is a block diagram of a data center including the data storage device illustrated in FIG. 1 or 9, according to an embodiment of the inventive concept.

FIG. 16 is a block diagram of a data center 400 including the data storage device 300A or 300B illustrated in FIG. 1 or 9, according to embodiments of the inventive concept. Referring to FIGS. 1 through 16, the data center 400 may include a plurality of client computers, indicated by representative client computers 410-1 through 410-3, a first network 420, a server (or web server) 430, a second network 440, and a data processing system 100, which may be the data processing system 100A or 100B, for example (collectively denoted by reference numeral 100). The data processing system 200 includes the host 200 and the data storage device 300A or 300B, for example (collectively denoted by reference numeral 300). The data center 400 may be a search portal or an internet data center (IDC), for example.

The client computers 410-1 through 410-3 communicates with the server 430 via the first network 420. Each of the client computers 410-1 through 410-3 may be implemented as a PC, a laptop computer, a smart phone, a tablet PC, a PDA, a MID, a wearable computer, an IoT device, or an IoE device, for example. The server 430 transmits data to and receives data from the host 200 via the second network 440. When the data storage device 300 functions as a database, the host 200 may function as a database server that controls the operations of the database.

The host 200 may control the operations of the data storage device 300. Each of the networks 420 and 440 may be a wired network, a wireless network, internet, Wi-Fi, or a cellular network, for example.

Although devices and methods to compensate for an initial threshold voltage shift or initial threshold voltage distribution shift using multiple hash value generators and multiple hash value tables have been described above, the inventive concept may also be applied according to other illustrative embodiments, such as: (1) a device and method to compensate for an initial threshold voltage shift or initial threshold voltage distribution shift using a single hash value generator and a single hash value table; (2) a device and method to compensate for an initial threshold voltage shift or initial threshold voltage distribution shift using multiple hash value generators and a single hash value table; and (3) a device and method to compensate for an initial threshold voltage shift or initial threshold voltage distribution shift using a single hash value generator and multiple hash value tables.

As described above, according to various embodiments of the inventive concept, a data storage device is allowed to include a table that stores compression values (or hash values) for addresses input during a predetermined time interval as values used to compensate for an initial threshold voltage shift, so that the data storage device can store the addresses, for which compensation for the initial threshold voltage shift is required, in an internal memory having a small capacity.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of operating a data storage device capable of compensating for an initial threshold voltage shift of a plurality of memory cells, the method comprising:
generating a first compression value for a first write address corresponding to a first write request input during a first time interval among different time intervals; and
storing the first compression value in a first table among a plurality of tables;
generating a second compression value for a read address corresponding to a read request input during a second time interval among the different time intervals;
searching the plurality of tables for the first table that stores the first compression value the same as the second compression value;
compensating for the initial threshold voltage shift of the plurality of memory cells based on an index of the first table; and
performing a read operation corresponding to the read request using a read voltage corresponding to the compensated initial threshold voltage shift.

2. The method of claim 1, wherein storing the first compression value in the first table comprises:
selecting the first table from among the plurality of tables using a first time stamp corresponding to the first write request; and
storing the first compression value in the selected first table.

3. The method of claim 1, wherein compensating for the initial threshold voltage shift is performed based on a second time stamp corresponding to the read request and the index of the first table.

4. The method of claim 3, wherein compensating for the initial threshold voltage shift comprises:
generating a control code based on the second time stamp and the index of the first table;
storing the control code in a memory including the plurality of memory cells; and
compensating for the initial threshold voltage shift of the plurality of memory cells using the control code stored in the memory.

5. The method of claim 1, wherein each of the first compression value and the second compression value is generated using one hash value generator.

6. The method of claim 1, wherein the first compression value and the second compression value comprise first and second hash values output from different hash value generators, respectively.

7. The method of claim 1, further comprising:
initializing the plurality of tables periodically.

8. The method of claim 1, further comprising:
writing first write data corresponding to the first write request to a three-dimensional flash memory including the plurality of memory cells when the data storage device comprises the three-dimensional flash memory.

9. The method of claim 1, wherein the different time intervals correspond to the plurality of tables, respectively.

10. A data storage device, comprising:
a memory including a plurality of memory cells; and
a controller configured to compensate for an initial threshold voltage shift of the plurality of memory cells,
wherein the controller comprises a compensation circuit configured to:
generate a first compression value for a first write address corresponding to a first write request input during a first time interval among different time intervals,
store the first compression value in a first table among a plurality of tables,
generate a second compression value for a read address corresponding to a read request input during a second time interval among the different time intervals, and
search the plurality of tables for the first table that stores the first compression value the same as the second compression value,
wherein the memory is configured to compensate for the initial threshold voltage shift of the plurality of memory cells based on an index of the first table, and to perform a read operation corresponding to the read request using a read voltage corresponding to the compensated initial threshold voltage shift, and to output the data to the controller.

11. The data storage device of claim 10, wherein the compensation circuit comprises:
a compression value generation circuit configured to generate the first compression value for the first write address; and
a search circuit configured to select the first table from among the plurality of tables using a first time stamp corresponding to the first write request and to store the first compression value in the selected first table,
wherein the different time intervals correspond to the plurality of tables, respectively.

12. The data storage device of claim 11, wherein the compression value generation circuit generates the second compression value for a read address corresponding to a read request input during the second time interval among the different time intervals, and
wherein the search circuit searches the plurality of tables for the first table that stores the first compression value the same as the second compression value.

13. The data storage device of claim 10, wherein the compression value generation circuit generates the first compression value including at least one hash value and the second compression value including at least one second hash value using at least one hash value generator.

14. The data storage device of claim 11, wherein the search circuit outputs an index of the first table as a search result, and the controller further comprises:
a decision circuit configured to generate a control code using a second time stamp corresponding to the read request and the index of the first table; and
a central processing unit (CPU) configured to output a compensation code for compensating for the initial threshold voltage shift in response to the control code,
wherein the memory compensates for the initial threshold voltage shift of the memory cells using the compensation code output from the CPU, reads data corresponding to the read command from the memory cells using a read voltage corresponding to the compensated initial threshold voltage shift, and outputs the data to the controller.

15. The data storage device of claim 10, wherein the controller further comprises an internal memory configured to store the plurality of tables and the controller initializes the tables periodically.

16. A data processing system comprising:

a data storage device according to claim 10; and a host configured to control an operation of the data storage device.

17. The data processing system of claim 16, wherein the memory comprises a three-dimensional memory array including the plurality of memory cells, and wherein the three-dimensional memory array comprises a non-volatile memory that is monolithically formed in one or more physical levels of memory cells having active areas disposed above a silicon substrate.

18. The data processing system of claim 16, where the memory comprises a three-dimensional memory array including the plurality of memory cells, and wherein the three-dimensional memory array comprises a plurality of memory cells, each of the memory cells including a charge trap layer.

19. A data storage device, comprising:

a memory including a plurality of memory cells; and a controller configured to compensate for an initial threshold voltage shift of the plurality of memory cells in response to a control code, wherein the controller comprises a central processing unit configured to generate a first compression value for a first write address corresponding to a first write request input during a first time interval among different time intervals, and to store the first compression value in a first table among a plurality of tables, and wherein the central processing unit comprises:

a compression value generation module configured to generate a first compression value for the first write address and a second compression value for a read address corresponding to a read request input during a second time interval among the different time intervals;

a search engine configured to select the first table from among the plurality of tables using a first time stamp corresponding to the first write request and to store the first compression value in the selected first table, wherein the different time intervals correspond to the plurality of tables, respectively; and a decision module configured to generate the control code using a second time stamp corresponding to the read request and an index of the first table.

* * * * *